US012275629B2

(12) United States Patent
Kuo et al.

(10) Patent No.: US 12,275,629 B2
(45) Date of Patent: *Apr. 15, 2025

(54) FLUID MATERIAL DISPENSING APPARATUS CAPABLE OF FLEXIBLY ADJUSTING TEMPERATURE OF WATER TO BE DISPENSED

(71) Applicant: Botrista, Inc., Dover, DE (US)

(72) Inventors: Wu-Chou Kuo, San Francisco, CA (US); Yu-Min Lee, Taipei (TW); Yu Wei Chen, San Francisco, CA (US)

(73) Assignee: Botrista, Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/763,684

(22) Filed: Jul. 3, 2024

(65) Prior Publication Data

US 2025/0002320 A1 Jan. 2, 2025

Related U.S. Application Data

(60) Continuation-in-part of application No. 18/375,075, filed on Sep. 29, 2023, now Pat. No. 12,077,423, (Continued)

(51) Int. Cl.
*B67D 1/07* (2006.01)
*B67D 1/12* (2006.01)

(52) U.S. Cl.
CPC ............ *B67D 1/07* (2013.01); *B67D 1/1277* (2013.01)

(58) Field of Classification Search
CPC ................................ B67D 1/07; B67D 1/1277
See application file for complete search history.

(56) References Cited

U.S. PATENT DOCUMENTS 360,422 A * 4/1887 Dougherty ........... B67D 1/0425 92/92
6,669,051 B1 12/2003 Phallen et al.
(Continued)

FOREIGN PATENT DOCUMENTS

CN 102781293 A 11/2012
CN 104154267 A 11/2014
(Continued)

OTHER PUBLICATIONS

Chinese Office Action and Search Report for Chinese Application No. 202111040353.0, dated Jan. 27, 2024, with partial English translation.

(Continued)

*Primary Examiner* — Jeremy Carroll
(74) *Attorney, Agent, or Firm* — Birch, Stewart, Kolasch & Birch, LLP

(57) ABSTRACT

A fluid material dispensing apparatus includes: a target nozzle for dispensing water to a target container; a water drainage port; a temperature adjustment device for adjusting a temperature of received water to produce a temperature-adjusted water; a flow direction control device coupled with target nozzle, the temperature adjustment device, and the water drainage port; and a control circuit. When the control circuit determines that a temperature of the temperature-adjusted water reaches a predetermined temperature, the control circuit controls the flow direction control device to guide the temperature-adjusted water to flow toward the target nozzle through the first output terminal, so that the target nozzle dispenses the temperature-adjusted water into the target container.

8 Claims, 21 Drawing Sheets

Related U.S. Application Data which is a division of application No. 17/467,960, filed on Sep. 7, 2021, now Pat. No. 11,814,280, which is a continuation-in-part of application No. 17/218,314, filed on Mar. 31, 2021, now Pat. No. 11,597,642.

(60) Provisional application No. 63/636,426, filed on Apr. 19, 2024, provisional application No. 63/143,217, filed on Jan. 29, 2021, provisional application No. 63/110,621, filed on Nov. 6, 2020.

(56) References Cited

U.S. PATENT DOCUMENTS

| | | | | |
|---|---|---|---|---|
| 6,695,168 | B2 | 2/2004 | Pinedjian et al. | |
| 10,561,281 | B1 | 2/2020 | Lu | |
| 10,662,053 | B2 | 5/2020 | Petermann | |
| 10,689,239 | B1 | 6/2020 | Siegel | |
| 11,407,629 | B1 | 8/2022 | Siegel | |
| 2007/0151992 | A1* | 7/2007 | Carlson | B67D 1/0867 222/509 |
| 2008/0141702 | A1* | 6/2008 | Gagliano | B67D 1/1275 62/389 |
| 2010/0176147 | A1* | 7/2010 | Segers | B67D 1/0837 222/1 |
| 2011/0049185 | A1 | 3/2011 | Buchik | |
| 2012/0328456 | A1* | 12/2012 | Maisch | A47J 31/468 417/375 |
| 2016/0297665 | A1 | 10/2016 | Petermann | |
| 2021/0316979 | A1 | 10/2021 | Hayes-Pankhurst et al. | |
| 2023/0380442 | A1* | 11/2023 | Carter | A23G 9/228 |
| 2023/0380443 | A1* | 11/2023 | Cloud | F25B 41/20 |

FOREIGN PATENT DOCUMENTS

| | | | |
|---|---|---|---|
| CN | 102781293 | B | 8/2015 |
| WO | WO 2011/107574 | A2 | 9/2011 |

OTHER PUBLICATIONS

Taiwanese Notice of Allowance dated Dec. 10, 2021 for Application No. 110133099 with an English translation.

Taiwanese Office Action and Search Report, dated Jul. 14, 2021, for Taiwanese Application No. 110112000, with a partial English translation of the Taiwanese Office Action and a full English translation of the Taiwanese Search Report.

US Office Action for U.S. Appl. No. 18/763,816, dated Dec. 12, 2024.

* cited by examiner

FLUID MATERIAL DISPENSING APPARATUS CAPABLE OF FLEXIBLY ADJUSTING TEMPERATURE OF WATER TO BE DISPENSED

CROSS-REFERENCE TO RELATED APPLICATIONS

This application is a Continuation-In-Part of and claims the benefit of priority to U.S. patent application Ser. No. 18/375,075, filed on Sep. 29, 2023, which is a Divisional of U.S. patent application Ser. No. 17/467,960, filed on Sep. 7, 2021, now U.S. Pat. No. 11,814,280, issued on Nov. 14, 2023, which is a Continuation-In-Part of and claims the benefit of priority to U.S. patent application Ser. No. 17/218,314, filed on Mar. 31, 2021, now U.S. Pat. No. 11,597,642, issued on Mar. 7, 2022; which claims the benefit of U.S. Provisional Application Ser. No. 63/110,621, filed on Nov. 6, 2020, and also claims the benefit of U.S. Provisional Application Ser. No. 63/143,217, filed on Jan. 29, 2021; the entirety of which is incorporated herein by reference for all purposes.

This application claims the benefit of priority to U.S. Provisional Application Ser. No. 63/636,426, filed on Apr. 19, 2024; the entirety of which is incorporated herein by reference for all purposes.

BACKGROUND

The disclosure generally relates to a fluid material dispensing apparatus and, more particularly, to a fluid material dispensing apparatus capable of flexibly adjusting temperature of water to be dispensed.

For many consumers, freshly made beverages are more attractive than factory-produced canned or bottled beverages in many aspects, such as freshness, taste, and/or flexibility of customizing ingredient combinations. Therefore, many restaurants and beverage vendors offer a variety of freshly made beverages to meet the needs of their customers. The traditional approach of manually preparing freshly made beverages has many disadvantages. For example, it is not easy to maintain the taste consistency of freshly made beverages, personnel training requires considerable time and cost, and the preparation of the freshly made beverages often consumes a lot of labor time, or the like. As a result of rising labor costs and other factors (e.g., increased operating costs due to the impact of the pandemic or inflation), many restaurants and beverage vendors have begun to use a variety of machinery and equipment to provide or assist in the preparation of freshly-made beverages in order to reduce the required labor time and costs.

As is well known, different customers have varying preferences or needs regarding the temperature of their beverages. However, the traditional beverage dispensers lack the ability of flexibly adjusting the temperature of beverages according to customer preferences, so they usually can only provide beverages at a fixed temperature. If a customer wants to change the temperature of the beverage, either the customer or the staff would need to add ice into or heat the beverage made by the traditional beverage dispenser. Such approaches are not only inconvenient but also make it difficult to precisely control the temperature of the resulting beverage, and may even adversely affect the taste of the resulting beverage.

SUMMARY

An example embodiment of a fluid material dispensing apparatus is disclosed, comprising: a target nozzle, arranged to operably dispense water to a target container; a water drainage port; a temperature adjustment device, arranged to operably adjust a temperature of a received water to produce and output a temperature-adjusted water; a flow direction control device, comprising: an input terminal, coupled with the temperature adjustment device, and arranged to operably receive the temperature-adjusted water produced by the temperature adjustment device; a first output terminal, coupled with the target nozzle; and a second output terminal, coupled with the water drainage port; and a control circuit, coupled with the flow direction control device, and arranged to operably control the flow direction control device; wherein when the control circuit determines that a temperature of the temperature-adjusted water reaches a predetermined temperature, the control circuit controls the flow direction control device to guide the temperature-adjusted water to flow toward the target nozzle through the first output terminal, so that the target nozzle dispenses the temperature-adjusted water into the target container.

Another example embodiment of a fluid material dispensing apparatus utilized for using a temperature-adjusted water produced by an external temperature adjustment device to make beverages is disclosed, comprising: a target nozzle, arranged to operably dispense water to a target container; a water drainage port; a flow direction control device, comprising: an input terminal, arranged to operably receive the temperature-adjusted water produced by the external temperature adjustment device; a first output terminal, coupled with the target nozzle; and a second output terminal, coupled with the water drainage port; and a control circuit, coupled with the flow direction control device, and arranged to operably control the flow direction control device; wherein when the control circuit determines that a temperature of the temperature-adjusted water reaches a predetermined temperature, the control circuit controls the flow direction control device to guide the temperature-adjusted water to flow toward the target nozzle through the first output terminal, so that the target nozzle dispenses the temperature-adjusted water into the target container.

Another example embodiment of a fluid material dispensing apparatus utilized for using a temperature-adjusted water produced by an external temperature adjustment device to make beverages is disclosed, comprising: a target nozzle, arranged to operably dispense water to a target container; a water drainage port; a flow direction control device, comprising: an input terminal, arranged to operably receive the temperature-adjusted water produced by the external temperature adjustment device; a first output terminal, coupled with the target nozzle; and a second output terminal, coupled with the water drainage port; a source selection device, coupled between the external temperature adjustment device and the input terminal of the flow direction control device, and arranged to operably receive the temperature-adjusted water outputted from the temperature adjustment device and water without temperature adjustment; one or more temperature sensors, arranged to operably sense a temperature of the temperature-adjusted water; a flowmeter, arranged to operably measure a flow of the temperature-adjusted water to be dispensed to the target container through the target nozzle; a switch device, coupled between the external temperature adjustment device and the input terminal of the flow direction control device, and arranged to operably control whether the temperature-adjusted water can be transmitted to the flow direction control device; and a control circuit, coupled with the one or more temperature sensors, and arranged to operably control operations of the source selection device, the flow direction control device, the flowmeter, and the switch device; wherein when the control circuit determines that the temperature of the temperature-adjusted water reaches a predetermined temperature, the control circuit controls the flow direction control device to guide the temperature-adjusted water to flow toward the target nozzle through the first output terminal, so that the target nozzle dispenses the temperature-adjusted water into the target container; wherein before the control circuit determines that the temperature of the temperature-adjusted water reaches the predetermined temperature, the control circuit controls the flow direction control device to block the first output terminal and to guide the temperature-adjusted water to flow toward the water drainage port through the second output terminal, so as to prevent the target nozzle from dispensing the temperature-adjusted water into the target container.

Another example embodiment of a fluid material dispensing apparatus is disclosed, comprising: a target nozzle, arranged to operably dispense water to a target container; a water drainage port; a temperature adjustment device, arranged to operably adjust a temperature of a received water to produce and output a temperature-adjusted water; a flow direction control device, comprising: an input terminal, coupled with the temperature adjustment device, and arranged to operably receive the temperature-adjusted water produced by the temperature adjustment device; a first output terminal, coupled with the target nozzle; and a second output terminal, coupled with the water drainage port; and a control circuit, coupled with the flow direction control device, and arranged to operably control the flow direction control device; wherein when the control circuit determines that a temperature of the temperature-adjusted water reaches a predetermined temperature, the control circuit controls the flow direction control device to guide the temperature-adjusted water to flow toward the target nozzle through the first output terminal, so that the target nozzle dispenses the temperature-adjusted water into the target container.

Another example embodiment of a fluid material dispensing apparatus utilized for using a temperature-adjusted water produced by an external temperature adjustment device to make beverages is disclosed, comprising: a target nozzle, arranged to operably dispense water to a target container; a water drainage port; a flow direction control device, comprising: an input terminal, arranged to operably receive the temperature-adjusted water produced by the external temperature adjustment device; a first output terminal, coupled with the target nozzle; and a second output terminal, coupled with the water drainage port; and a control circuit, coupled with the flow direction control device, and arranged to operably control the flow direction control device; wherein when the control circuit determines that a temperature of the temperature-adjusted water reaches a predetermined temperature, the control circuit controls the flow direction control device to guide the temperature-adjusted water to flow toward the target nozzle through the first output terminal, so that the target nozzle dispenses the temperature-adjusted water into the target container.

Another example embodiment of a fluid material dispensing apparatus utilized for using a temperature-adjusted water produced by an external temperature adjustment device to make beverages is disclosed, comprising: a target nozzle, arranged to operably dispense water to a target container; a water drainage port; a flow direction control device, comprising: an input terminal, arranged to operably receive the temperature-adjusted water produced by the external temperature adjustment device; a first output terminal, coupled with the target nozzle; and a second output terminal, coupled with the water drainage port; a source selection device, coupled between the external temperature adjustment device and the input terminal of the flow direction control device, and arranged to operably receive the temperature-adjusted water outputted from the temperature adjustment device and water without temperature adjustment; a flowmeter, coupled between the external temperature adjustment device and the input terminal of the flow direction control device, and arranged to operably measure a flow of the temperature-adjusted water to be transmitted to the flow direction control device; a switch device, coupled between the external temperature adjustment device and the input terminal of the flow direction control device, and arranged to operably control whether the temperature-adjusted water can be transmitted to the flow direction control device; and a control circuit, arranged to operably control operations of the source selection device, the flow direction control device, the flowmeter, and the switch device; wherein the control circuit comprises: a timer, arranged to operably record a duration of time for the source selection device outputting the temperature-adjusted water, a duration of time for the flowmeter outputting the temperature-adjusted water, a duration of time for the switch device outputting the temperature-adjusted water, or a duration of time for the flow direction control device outputting the temperature-adjusted water to the water drainage port, and to operably generate a corresponding time-length value; wherein when the time-length value reaches a predetermined value, the control circuit determines that a temperature of the temperature-adjusted water reaches a predetermined temperature, and controls the flow direction control device to guide the temperature-adjusted water to flow toward the target nozzle through the first output terminal, so that the target nozzle dispenses the temperature-adjusted water into the target container; wherein before the control circuit determines that the temperature of the temperature-adjusted water reaches the predetermined temperature, the control circuit controls the flow direction control device to block the first output terminal and to guide the temperature-adjusted water to flow toward the water drainage port through the second output terminal, so as to prevent the target nozzle from dispensing the temperature-adjusted water into the target container.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
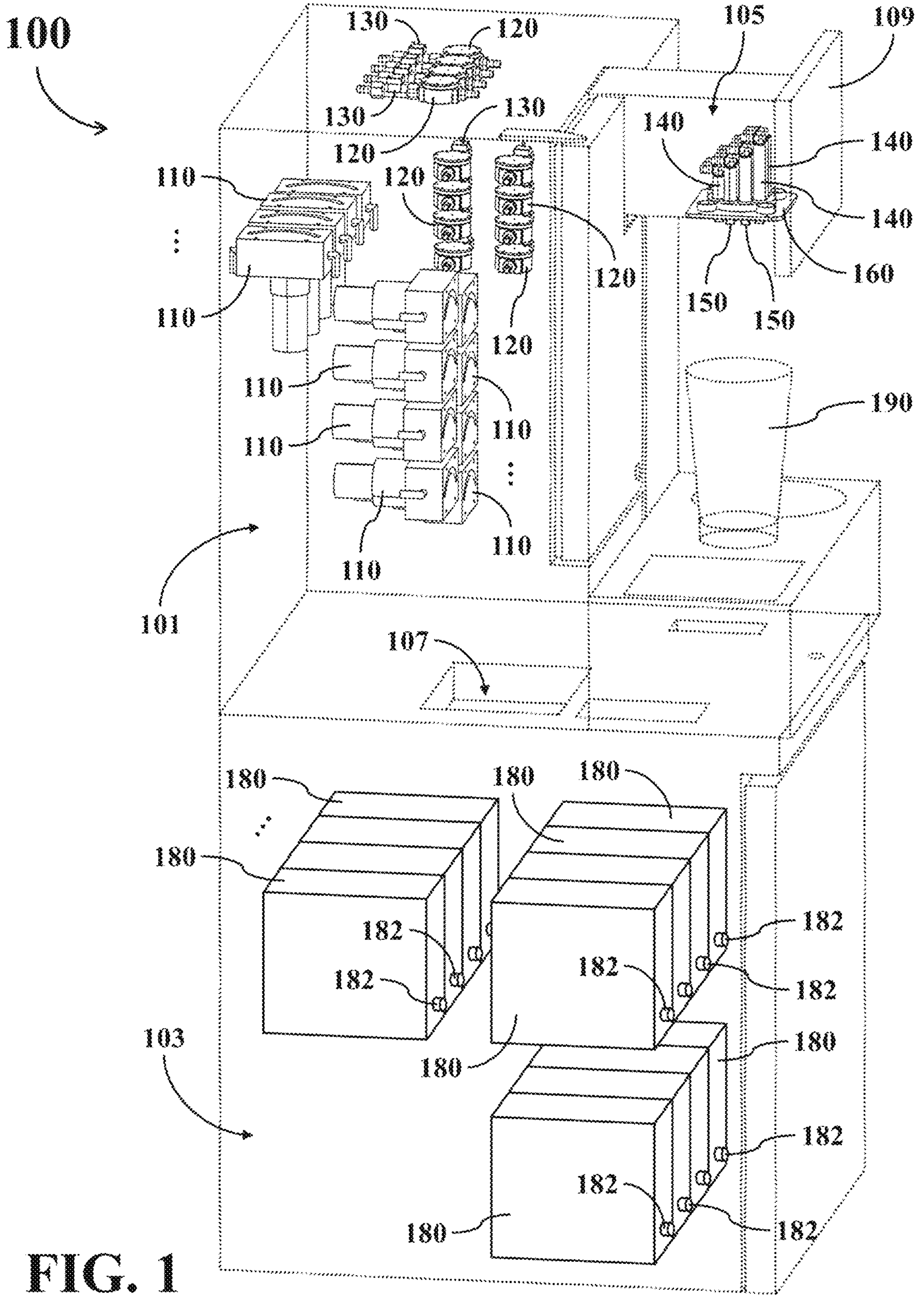
FIG. 1 shows a simplified schematic perspective diagram of a fluid material dispensing apparatus according to one embodiment of the present disclosure.
Figure 2:
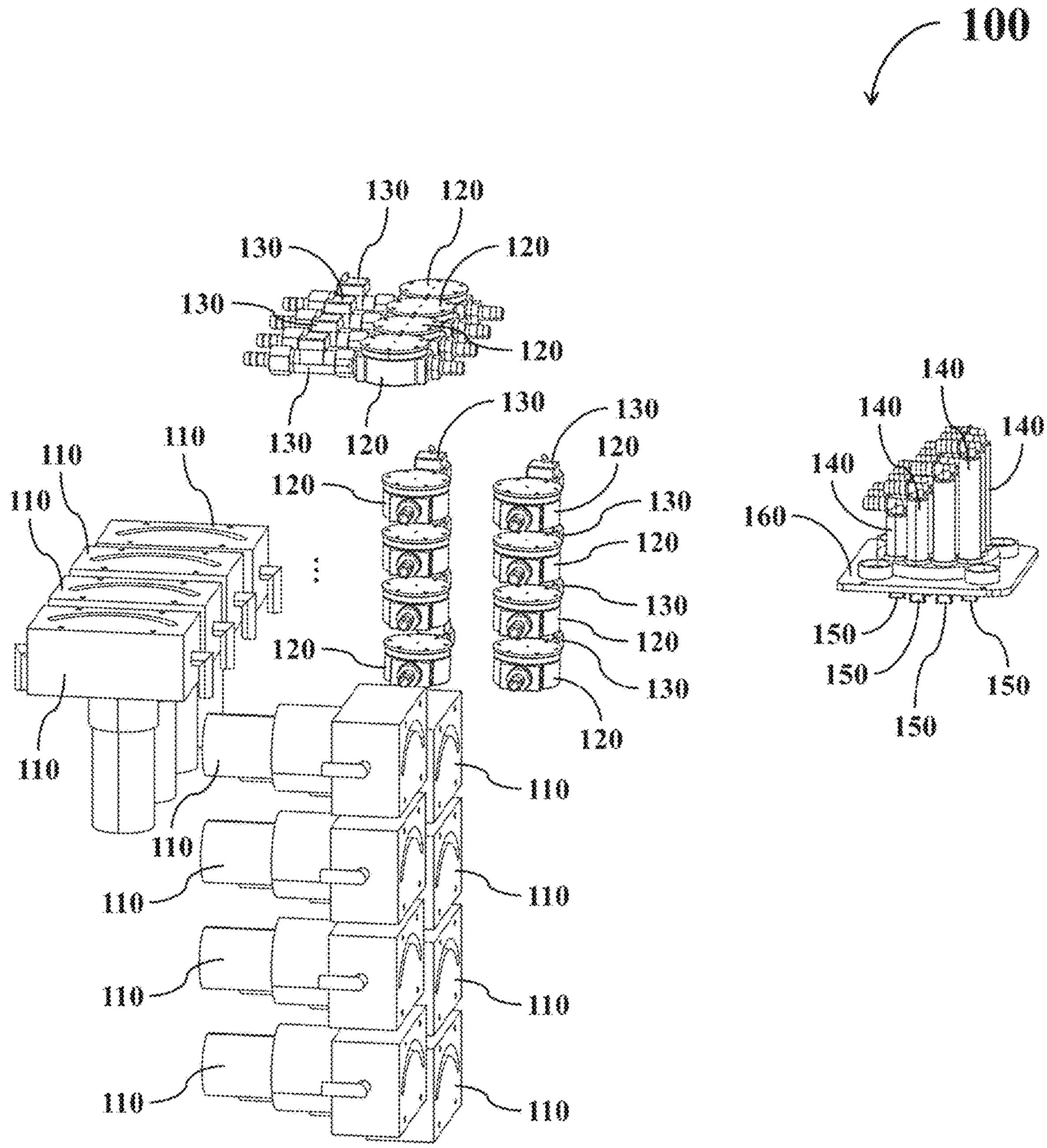
FIGS. 2-3 show simplified schematic diagrams illustrating spatial arrangement of some components of the fluid material dispensing apparatus of FIG. 1 from different viewing angles.
Figure 3:
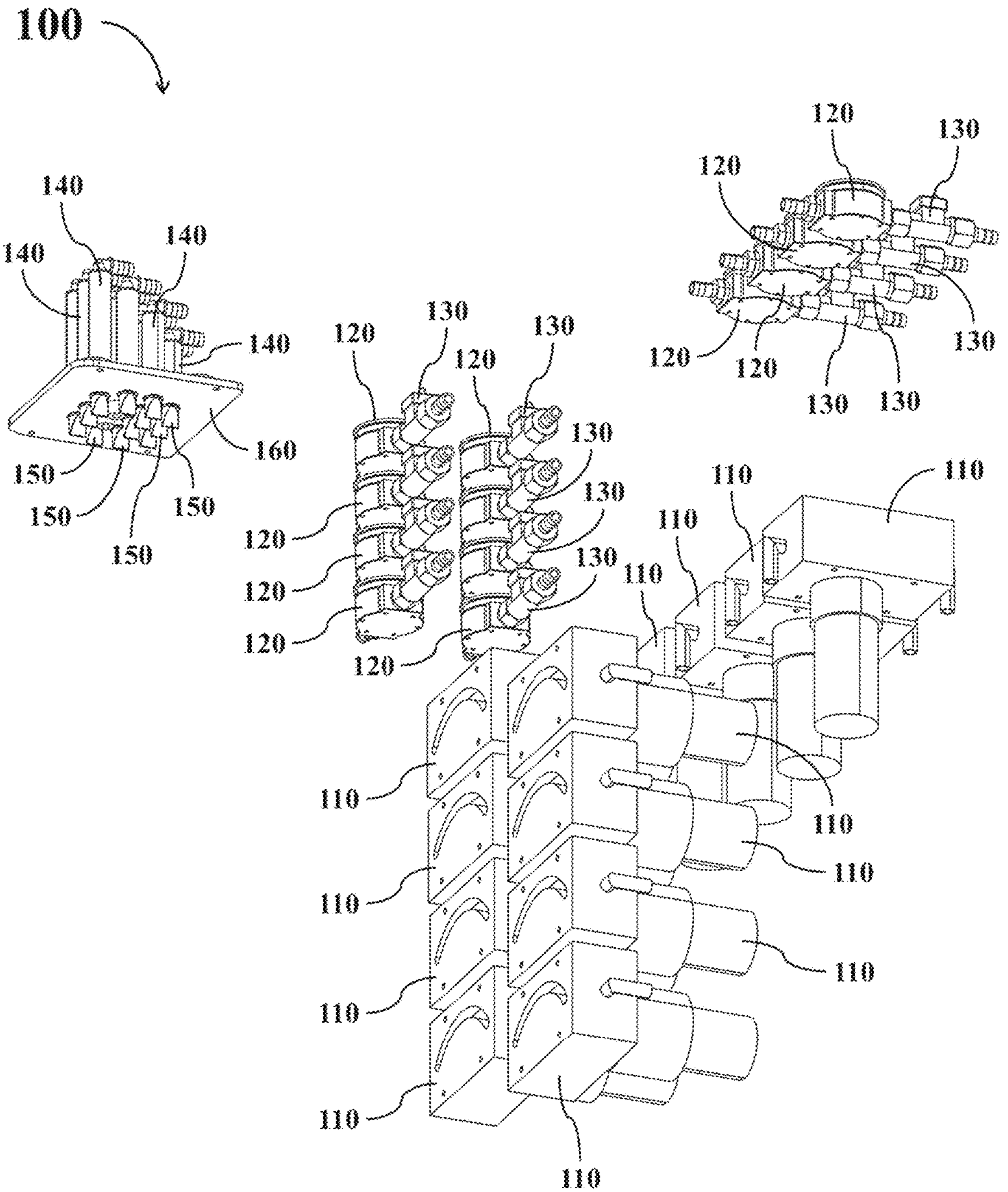

Please refer to FIG. 1 through FIG. 3. FIG. 1 shows a simplified schematic perspective diagram of a fluid material dispensing apparatus 100 according to one embodiment of the present disclosure. FIGS. 2~3 show simplified schematic diagrams illustrating spatial arrangement of some components of the fluid material dispensing apparatus 100 from different viewing angles. The fluid material dispensing apparatus 100 may be utilized to automatically conduct beverage preparation operation to make beverages or output various fluid materials (e.g., various sauces) for use in food seasoning.

In the embodiment of FIG. 1, the fluid material dispensing apparatus 100 comprises an upper chamber 101, a lower chamber 103, a neck chamber 105, one or more connecting channels 107, and a control panel 109. In order to reduce the complexity of the drawing contents, the appearance outline of the fluid material dispensing apparatus 100 is deliberately represented by dashed lines in FIG. 1, while some internal objects to be further described in the following are depicted with solid lines. Please note that the appearance shape of the fluid material dispensing apparatus 100 is merely a simplified exemplary embodiment for the purpose of explanatory convenience, rather than a restriction to the actual appearance of the fluid material dispensing apparatus 100.

The upper chamber 101 of the fluid material dispensing apparatus 100 may be connected to the neck chamber 105, and may be connected to the lower chamber 103 through the connecting channel 107. Relevant wires, signal lines, connectors, and/or material transmission pipes may be arranged inside the fluid material dispensing apparatus 100 in a variety of appropriate ways.

As shown in FIG. 1 through FIG. 3, the fluid material dispensing apparatus 100 further comprises a plurality of pumps 110, a plurality of damper devices 120, a plurality of flowmeters 130, a plurality of material output tubes 140, a plurality of nozzles 150, and a connecting plate 160.

Each of the aforementioned pumps 110 may be connected to other components through various material transmission pipes and connectors, and may be installed within the upper chamber 101, the lower chamber 103, and/or the neck chamber 105 in a variety of appropriate spatial arrangements, not restricted to the spatial arrangement shown in FIG. 1 through FIG. 3.

Each of the aforementioned damper devices 120 and flowmeters 130 may be connected to other components through various material transmission pipes and connectors, and may be installed within the upper chamber 101, the lower chamber 103, and/or the neck chamber 105 in a variety of appropriate spatial arrangements, not restricted to the spatial arrangement shown in FIG. 1 through FIG. 3.

Each of the aforementioned material output tubes 140 may be connected to other components through various material transmission pipes and connectors, and may be installed within the neck chamber 105 in a variety of appropriate spatial arrangements, not restricted to the spatial arrangement shown in FIG. 1 through FIG. 3.

The aforementioned nozzles 150 may be detachably arranged on the connecting plate 160 through various appropriate connections, and the connecting plate 160 may be detachably arranged beneath the neck chamber 105 through various appropriate connections, not restricted to the spatial arrangement shown in FIG. 1 through FIG. 3. In addition, the input terminal of each nozzle 150 may be connected to the output terminal of a corresponding material output tube 140 through various material transmission pipes and connectors. The output terminals of respective nozzles 150 and the connecting plate 160 can be exposed outside the neck chamber 105 to facilitate the user to carry out relevant cleaning procedures.

As shown in FIG. 1, multiple material containers 180 may be placed within the lower chamber 103 of the fluid material dispensing apparatus 100. Different material containers 180 may be utilized to store different fluid materials. For example, the aforementioned fluid material may be common beverage base material, such as water, sparkling water, black tea, green tea, soy milks, milk, milk-based liquids, coffee, nut pulps, various fruit-based concentrates, various vegetable-based concentrates, or the like.

For another example, the aforementioned fluid material may be various syrups, such as agave syrup, dulce de leche, fructose, golden syrup, lemonade syrups, maltose syrup, maple syrup, molasses, orgeat, and/or palm syrup, or the like.

For yet another example, the aforementioned fluid material may be various alcoholic beverages, such as beer, cocktails, and/or sake, or the like.

For yet another example, the aforementioned fluid material may be various sauces or fluid condiments, such as apple sauce, chutneys, cranberry sauce, salad dressings, fruit coulis, ketchup, tomato sauce, mayonnaise, meat gravies, miso sauce, hummus, pasta sauce, piccalilli, soy sauce, spices sauce, spicy sauce, and/or ginger jam, or the like.

For yet another example, the aforementioned fluid material may be various fluid materials, such as fruit juices containing fruit fibers, tea liquids with small particles (e.g., pearl or tapioca balls), honey, cooking oils, vinegar, jams, marmalade, pressed fruit paste, beer vinegar, buttercream, condensed milk, and/or cream, or the like.

As can be appreciated from the foregoing descriptions, the fluid material that the fluid material dispensing apparatus 100 can output may be fluid having higher viscosity than water, and may be fluid having lower viscosity than water.

Each material container 180 has an outlet connector 182, which may be connected to a corresponding component (e.g., a corresponding pump 110 or a corresponding damper device 120) through various material transmission pipes and connectors.

In other embodiments, all of or some of the material containers 180 may be instead placed within the upper chamber 101, without being restricted to the spatial arrangement shown in FIG. 1. In practice, appropriate refrigeration equipment may be installed within the fluid material dispensing apparatus 100 to extend the storage time of various fluid materials.

Please note that the quantity of the pumps 110, the damper devices 120, the flowmeters 130, the material output tubes 140, the nozzles 150, the connecting plate 160, and the material containers 180 shown in FIG. 1 through FIG. 3 is merely an exemplary embodiment, rather than a restriction to the practical implementations.

Figure 4:
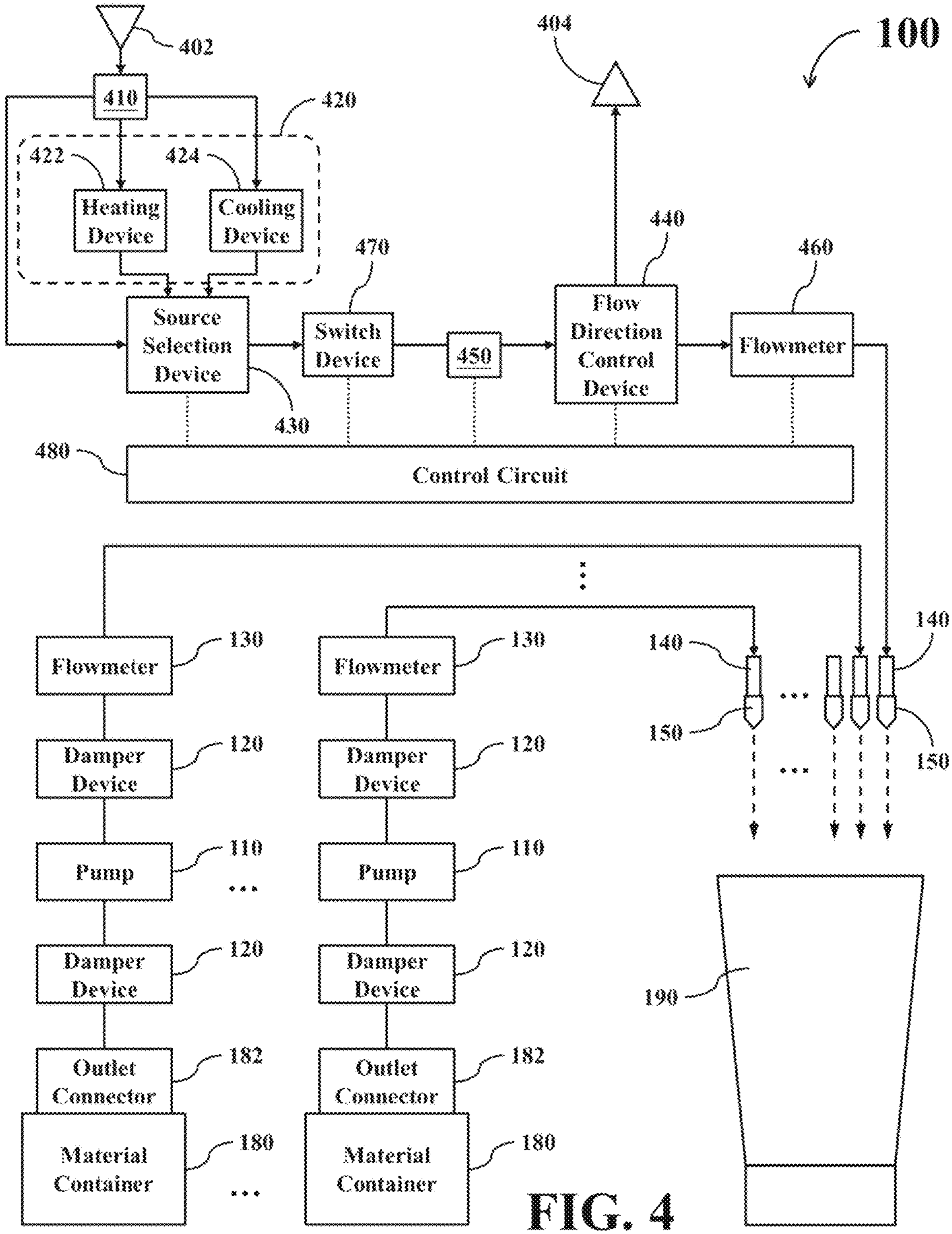
FIG. 4 shows a simplified functional block diagram of some components of the fluid material dispensing apparatus of FIG. 1 according to a first embodiment of the present disclosure.

Please refer to FIG. 4, which shows a simplified functional block diagram of some components of the fluid material dispensing apparatus 100 according to one embodiment of the present disclosure. The fluid material dispensing apparatus 100 comprises multiple material dispensing devices, which are respectively responsible for delivering the fluid materials stored in different material containers 180 to the output terminals of corresponding nozzles 150.

Each material dispensing device comprises a pump 110, one or more damper devices 120, a flowmeter 130, a material output tube 140, and a corresponding nozzle 150, wherein the pump 110, the one or more damper devices 120, the flowmeter 130, and the corresponding nozzle 150 may be connected by appropriate material transmission pipes and connectors to form a material transmission channel.

In order to reduce the complexity of the drawing contents, only two exemplary material dispensing devices are shown in FIG. 4 as an example for explanation. The components and operating mechanism of each material dispensing device can be applied to other material dispensing devices in the fluid material dispensing apparatus 100.

In each material dispensing device, the pump 110 is arranged to operably push the received fluid material to flow forward. In practice, the pump 110 may be realized with various appropriate liquid pump devices capable of pushing liquid forward, such as a peristaltic pump, a diaphragm pump, a rotary diaphragm pump, or the like.

A material inlet of the pump 110 may be coupled with the outlet connector 182 of a corresponding material container 180 through appropriate connectors and material transmission pipes, and arranged to operably receive the fluid material transmitted from the corresponding material container 180 through the outlet connector 182.

The damper device 120 is arranged to operably conduct a buffering operation on the fluid material flowing through the damper device 120. In some embodiments, an input terminal of the damper device 120 is coupled with a material outlet of the pump 110. In other words, the damper device 120 may be located at the subsequent stage of the pump 110. In practice, the damper device 120 may be directly connected to the material outlet of the pump 110, or may be indirectly connected to material outlet of the pump 110 through other appropriate connectors and material transmission pipes.

During the operations of the aforementioned pump 110, the fluid material may be intermittently pushed forward, and thus the liquid pressure at the material outlet of the pump 110 exhibits periodic fluctuations. Such a situation will cause the amount of the fluid material flowing into the damper device 120 to exhibit periodic fluctuations.

When the volume of the fluid material in the damper device 120 exceeds a predetermined amount (i.e., the nominal volume of the damper device 120), a buffer chamber of the damper device 120 would temporarily deform to expand, so that the amount of the fluid material in the damper device 120 can temporarily exceed the nominal volume of the damper device 120. Over time, the elastic restoring force of the buffer chamber will push the fluid material in the damper device 120 to flow toward the output terminal of the damper device 120, so that the amount of the fluid material in the damper device 120 will drop back to a level close to its nominal volume.

The flowmeter 130 may be coupled with the output terminal of the damper device 120, and arranged to operably measure the flow of fluid material passing through the flowmeter 130. In other words, the flowmeter 130 may be located at the subsequent stage of the damper device 120. In practice, the flowmeter 130 may be directly connected to the output terminal of the damper device 120, or may be indirectly connected to the output terminal of the damper device 120 through other appropriate connectors and material transmission pipes.

The material output tube 140 may be coupled with the output terminal of the flowmeter 130, and arranged to operably transmit the received fluid material toward the corresponding nozzle 150. In practice, the material output tube 140 may be indirectly connected to the output terminal of the flowmeter 130 through a connector with other appropriate material transmission pipes to increase the selection flexibility of the position of the material output tube 140.

The nozzle 150 is coupled with the output terminal of the material output tube 140, and arranged to operably output the fluid material transmitted from the material output tube 140 to the target container 190. In practice, the nozzle 150 may be directly connected to the output terminal of the material output tube 140, or may be indirectly connected to the output terminal of the material output tube 140 through the aforementioned connecting plate 160 or other appropriate material transmission pipes. The nozzle 150 may be realized with a duck bill valve, a check valve, or other appropriate outlet connector.

As described previously, the damper device 120 conducts a buffering treatment to the fluid material flowing through the damper device 120 with the deformation and elastic restoring force of its buffer chamber. Accordingly, both the flow speed variation and the liquid pressure variation of the fluid material outputted from the output terminal of the damper device 120 will be apparently lower than the flow speed variation and the liquid pressure variation of the fluid material received by the input terminal of the damper device 120. Such structure is beneficial for improving the measuring accuracy of the flowmeter 130 in measuring the flow of the fluid material passing through the flowmeter 130, thereby effectively increase the liquid volume control accuracy of the fluid material dispensing apparatus 100 for fluid material to be dispensed.

If the aforementioned damper device 120 is omitted, both the flow speed variation and the liquid pressure variation of the fluid material flowing through the flowmeter 130 will become greater. Such a situation will cause a negative impact to the measuring accuracy of the flowmeter 130 in measuring the flow of the fluid material, thereby reducing the flow measurement accuracy of the flowmeter 130.

Please note that the structure and connections between components of the material dispensing device described previously is merely an exemplary embodiment, rather than a restriction to the practical implementations of the material dispensing device.

In another embodiment, for example, the damper device 120 and the flowmeter 130 may be instead located at the prior stage of the pump 110. Specifically, the input terminal of the damper device 120 may instead be coupled with the outlet connector 182 of a corresponding material container 180 through appropriate connectors and material transmission pipes, so as to receive the fluid material transmitted from the corresponding material container 180. On the other hand, the material inlet of the pump 110 may instead be coupled with the output terminal of the flowmeter 130, so as to receive the fluid material passed through the flowmeter 130. That is, the flowmeter 130 is coupled between the damper device 120 and the pump 110 in this embodiment. In practice, the material inlet of the pump 110 may be directly connected to the output terminal of the flowmeter 130, or may be indirectly connected to the output terminal of the flowmeter 130 through appropriate connectors or material transmission pipes.

In yet another embodiment, the damper device 120 may be instead located at the prior stage of the pump 110 and the flowmeter 130 may be instead located at the prior stage of the damper device 120. Specifically, the input terminal of the flowmeter 130 is coupled with the outlet connector 182 of a corresponding material container 180, the input terminal of the damper device 120 is coupled with the output terminal of the flowmeter 130, and the material inlet of the pump 110 is coupled with the output terminal of the damper device 120.

In yet another embodiment, a first damper device 120 is coupled with the material outlet of the pump 110, while a second damper device 120 is coupled between the outlet connector 182 and the material inlet of the pump 110 as shown in FIG. 4. That is, each material dispensing device may comprise two damper devices 120. In this embodiment, the flowmeter 130 may be coupled with the output terminal of the first damper device 120, or coupled between the output terminal of the second damper device 120 and the material inlet of the pump 110.

It can be appreciated from the foregoing elaborations, by utilizing the damper device 120 to conduct a buffering operation on the fluid material flowing therethrough, the measurement accuracy of the flowmeter 130 in measuring the flow of the fluid material outputted from the damper device 120 can be significantly improved, thereby effectively increasing the output volume control accuracy of the fluid material dispensing apparatus 100 for fluid materials to be dispensed.

Even if the fluid materials employed by the fluid material dispensing apparatus 100 are liquids having a viscosity higher than water, for example, honey, various syrups, soy milks, nut pulps, fruit juice concentrates, fruit juices containing fruit fibers, tea-based liquids containing small particles (e.g., bubbles or tapioca balls), milk-based liquids, cooking oils, or other thick fluid material (e.g., various sauces) and so on, the usage amount of corresponding fluid material can be accurately measured and manipulated by adopting the material dispensing devices described previously.

As described previously, different customers have varying preferences or needs regarding the temperature of their beverages. However, the traditional beverage dispensers lack the ability of flexibly adjusting the temperature of beverages according to customer preferences. If a customer wants to change the temperature of the beverage, either the customer or the staff would need to add ice into or heat the beverage made by the traditional beverage dispenser. Such approaches are not only inconvenient but also make it difficult to precisely control the temperature of the resulting beverage, and may even adversely affect the taste of the resulting beverage.

For most freshly made beverages to be made by the fluid material dispensing apparatus 100, water is an essential material. In order to resolve the above problem, the fluid material dispensing apparatus 100 adopts a clever mechanism to flexibly adjusts the temperature of water to be dispensed to the target container 190. In this way, the fluid material dispensing apparatus 100 is enabled to flexibly adjust the temperature of resulting beverages to thereby meet different customer preferences.

As shown in FIG. 4, in addition to the multiple material dispensing devices described previously, the fluid material dispensing apparatus 100 further comprises a temperature-adjusted water dispensing device for flexibly adjusting the temperature of water to be dispensed into the target container 190. In the embodiment of FIG. 4, the temperature-adjusted water dispensing device comprises a water input port 402, a water drainage port 404, a fluid diverter 410, a temperature adjustment device 420, a source selection device 430, a flow direction control device 440, a temperature sensor 450, a flowmeter 460, a switch device 470, and a control circuit 480. In order to reduce the complexity of the drawing contents, other structures and devices of the fluid material dispensing apparatus 100 are not shown in FIG. 4.

The water input port 402 is arranged to operably receive water without temperature adjustment from an outside environment of the fluid material dispensing apparatus 100, such as a water tap, an external water supply device, or a water filtering device.

The fluid diverter 410 has one water input terminal and multiple water output terminals. The water input terminal of the fluid diverter 410 is coupled with the water input port 402 through various appropriate connectors and/or pipes to receive the water without temperature adjustment transmitted from the water input port 402. The fluid diverter 410 is arranged to operably output the received water without temperature adjustment through the multiple water output terminals. In practice, depending on the quantity of the water output terminals, the fluid diverter 410 may be realized with various water valves. For example, in the embodiments where the fluid diverter 410 has three water output terminals, the fluid diverter 410 may be realized with various four-way valves. In the embodiments where the fluid diverter 410 has two water output terminals, the fluid diverter 410 may be realized with various three-way valves.

The temperature adjustment device 420 is coupled with one or more water output terminals of the fluid diverter 410, and arranged to operably adjust a temperature of received water (i.e., the water without temperature adjustment transmitted from the fluid diverter 410) to produce and output temperature-adjusted water. In this embodiment, the temperature adjustment device 420 comprises a heating device 422 and a cooling device 424. The heating device 422 is coupled with a water output terminal of the fluid diverter 410, and arranged to operably heat the water without temperature adjustment to produce hot water having a higher temperature. The cooling device 424 is coupled with a water output terminal of the fluid diverter 410, and arranged to operably cool the water without temperature adjustment to produce cold water having a lower temperature. In other words, the temperature-adjusted water outputted from the temperature adjustment device 420 of this embodiment may refer to hot water or cold water. In practice, the heating device 422 may be realized with various appropriate water heaters capable of generating high-temperature drinking water, and the cooling device 424 may be realized with various appropriate water coolers capable of generating low-temperature drinking water.

The source selection device 430 is coupled with the control circuit 480, and has multiple water input terminals and a water output terminal, wherein the multiple water input terminals are utilized for respectively coupled with multiple different water sources, and the water output terminal is utilized for outputting water received by one of the multiple water input terminals. The source selection device 430 is arranged to selectively output water transmitted from one of the multiple water sources under control of the control circuit 480. That is, the source selection device 430 is arranged to selectively output either temperature-adjusted water or water without temperature adjustment toward the flow direction control device 440 in the temperature-adjusted water dispensing device.

In the embodiment of FIG. 4, for example, the source selection device 430 has a first water input terminal, a second water input terminal, and a third water input terminal. The first water input terminal is coupled with a water output terminal of the fluid diverter 410 through various appropriate connectors and/or pipes, and arranged to operably receive the water without temperature adjustment outputted from the water input port 402. The second water input terminal is coupled with the output of the heating device 422 of the temperature adjustment device 420 through various appropriate connectors and/or pipes, and arranged to operably receive the hot water outputted from the heating device 422. The third water input terminal is coupled with the output of the cooling device 424 of the temperature adjustment device 420 through various appropriate connectors and/or pipes, and arranged to operably receive the cold water outputted from the cooling device 424.

In operations, the source selection device 430 is only allowed to output water received from one of the multiple water sources at the same time under control of the control circuit 480. That is, when the water output terminal of the source selection device 430 outputs the water without temperature adjustment transmitted from the water input port 402, the water output terminal of the source selection device 430 does not (or is unable to) output the hot water transmitted from the heating device 422 and the cold water transmitted from the cooling device 424 at the same time. In addition, when the water output terminal of the source selection device 430 outputs the hot water transmitted from the heating device 422, the water output terminal of the source selection device 430 does not (or is unable to) output the water without temperature adjustment transmitted from the water input port 402 and the cold water transmitted from the cooling device 424 at the same time. Furthermore, when the water output terminal of the source selection device 430 outputs the cold water transmitted from the cooling device 424, the water output terminal of the source selection device 430 does not (or is unable to) output the water without temperature adjustment transmitted from the water input port 402 and the hot water transmitted from the heating device 422 at the same time.

In practice, depending on the quantity of the water input terminals, the source selection device 430 may be realized with various water valves. For example, in the embodiments where the source selection device 430 has three water input terminals, the source selection device 430 may be realized with various four-way valves. In the embodiments where the source selection device 430 has two water input terminals, the source selection device 430 may be realized with various three-way valves.

The flow direction control device 440 is coupled with the control circuit 480, and has an input terminal, a first output terminal, and a second output terminal. The input terminal is coupled with the water output terminal of the source selection device 430 through various appropriate connectors and/or pipes, and arranged to operably receive water outputted from the source selection device 430. The first output terminal is coupled with the target nozzle 150 through various appropriate connectors and/or pipes, and arranged to operably output received water to the target nozzle 150. The second output terminal is coupled with the water drainage port 404 through various appropriate connectors and/or pipes, and arranged to operably output received water to the water drainage port 404.

The flow direction control device 440 is arranged to operably decide where the water received by the flow direction control device 440 should flow toward. In this embodiment, the flow direction control device 440 is only allowed to output received water toward either the target nozzle 150 or the water drainage port 404 under control of the control circuit 480. That is, when the first output terminal of the flow direction control device 440 outputs water to the target nozzle 150, the second output terminal of the flow direction control device 440 does not (or is unable to) output water to the water drainage port 404. On the contrary, when the second output terminal of the flow direction control device 440 outputs water to the water drainage port 404, the first output terminal of the flow direction control device 440 does not (or is unable to) output water to the target nozzle 150.

In practice, the source selection device 430 may be realized with various water valves, such as various three-way valves.

The temperature sensor 450 is coupled with the control circuit 480, and arranged to operably sense and report the temperature of the temperature-adjusted water to the control circuit 480. In practice, the temperature sensor 450 may be arranged in any appropriate position inside the water transmission path between the temperature adjustment device 420 and the flow direction control device 440. Alternatively, the temperature sensor 450 may be attached on any appropriate position on the surface of the water transmission path between the temperature adjustment device 420 and the flow direction control device 440.

In the embodiment of FIG. 4, the temperature sensor 450 is positioned between the switch device 470 and the input terminal of the flow direction control device 440, and arranged to operably sense the temperature of the temperature-adjusted water to be transmitted from the temperature adjustment device 420 to the input terminal of the flow direction control device 440.

The flowmeter 460 is coupled with the control circuit 480, and arranged to operably measure a flow of water to be dispensed to the target container 190 through the target nozzle 150, so that the control circuit 480 can precisely control the volume of water to be dispensed to the target container 190.

In this embodiment, the flowmeter 460 is coupled with the first output terminal of the flow direction control device 440, and arranged to operably measure a flow of the temperature-adjusted water to be dispensed to the target container 190, or to operably measure a flow of the water without temperature adjustment to be dispensed to the target container 190.

The switch device 470 is coupled between the temperature adjustment device 420 and the input terminal of the flow direction control device 440, and arranged to operably control whether the temperature-adjusted water and/or the water without temperature adjustment can be transmitted to the flow direction control device 440. In the embodiment of FIG. 4, for example, the switch device 470 is coupled between the water output terminal of the source selection device 430 and the input terminal of the flow direction control device 440. In practice, the switch device 470 may be realized with various appropriate water gating devices or two-way valves.

The control circuit 480 is coupled with the temperature sensor 450, and arranged to operably control operations of the source selection device 430, the flow direction control device 440, the flowmeter 460, and the switch device 470.

When the temperature-adjusted water dispensing device does not need to dispense any water to the target container 190, the control circuit 480 may turn-off the switch device 470, so that no water can pass through the switch device 470.

When the fluid material dispensing apparatus 100 requires the temperature-adjusted water dispensing device to add water without temperature adjustment to the target container 190, the control circuit 480 controls the source selection device 430 to output the water without temperature adjustment transmitted from the water input port 402. In addition, the control circuit 480 turns on the switch device 470, so that the water without temperature adjustment can pass through the switch device 470 and flow to the flow direction control device 440. In this situation, the control circuit 480 would control the flow direction control device 440 to guide the water without temperature adjustment to flow toward the corresponding nozzle 150, so that the target nozzle 150 dispenses the water without temperature adjustment into the target container 190.

When the fluid material dispensing apparatus 100 requires the temperature-adjusted water dispensing device to add temperature-adjusted water to the target container 190, the control circuit 480 controls the source selection device 430 to output the temperature-adjusted water received from the temperature adjustment device 420. In addition, the control circuit 480 may turn on the switch device 470, so that the temperature-adjusted water can pass through the switch device 470 and flow to the flow direction control device 440.

In operations, the temperature adjustment device 420 may need to take a certain time to increase or decrease the temperature of received water, so that the resulting temperature-adjusted water can reach a required temperature. In this situation, the control circuit 480 controls the operation of the flow direction control device 440 (i.e., the water output direction of the flow direction control device 440) according to the temperature of the temperature-adjusted water.

As described previously, the control circuit 480 of this embodiment is enabled to obtain the temperature of the temperature-adjusted water based on the sensing result of the temperature sensor 450. Before the control circuit 480 determines that the temperature of the temperature-adjusted water reaches a predetermined temperature, the control circuit 480 controls the flow direction control device 440 to block the first output terminal and to guide the temperature-adjusted water to flow toward the water drainage port 404 through the second output terminal, so that the temperature-adjusted water can be discharged to outside the fluid material dispensing apparatus 100 through the water drainage port 404. Aa a result, the temperature-adjusted water dispensing device can prevent the target nozzle 150 from dispensing the temperature-adjusted water having an incorrect temperature into the target container 190.

When the control circuit 480 determines that the temperature of the temperature-adjusted water reaches the predetermined temperature, the control circuit 480 controls the flow direction control device 440 to guide the temperature-adjusted water to flow toward the target nozzle 150 through the first output terminal, so that the target nozzle 150 can dispense the temperature-adjusted water into the target container 190.

For example, when the fluid material dispensing apparatus 100 requires the temperature-adjusted water dispensing device to add hot water having a first predetermined temperature (e.g., 80 degrees Celsius or 90 degrees Celsius) to the target container 190, the control circuit 480 controls the source selection device 430 to output the hot water received from the heating device 422 of the temperature adjustment device 420. In addition, the control circuit 480 turns on the switch device 470, so that the hot water can pass through the switch device 470 and flow to the flow direction control device 440.

In operations, the heating device 422 of the temperature adjustment device 420 may need to take a certain time to heat the received water, so as to generate hot water having a sufficient high temperature. In this situation, the control circuit 480 controls the operation of the flow direction control device 440 (i.e., the water output direction of the flow direction control device 440) according to the temperature of the hot water.

Specifically, before the control circuit 480 determines that the temperature of the hot water reaches the first predetermined temperature, the control circuit 480 controls the flow direction control device 440 to block the first output terminal and to guide the hot water to flow toward the water drainage port 404 through the second output terminal, so as to prevent the target nozzle 150 from dispensing the hot water with wrong temperature into the target container 190.

Afterwards, when the control circuit 480 determines that the temperature of the hot water reaches the first predetermined temperature, the control circuit 480 controls the flow direction control device 440 to guide the hot water to flow toward the target nozzle 150 through the first output terminal, so that the target nozzle 150 can dispense hot water having a desired high temperature into the target container 190.

For another example, when the fluid material dispensing apparatus 100 requires the temperature-adjusted water dispensing device to add cold water having a second predetermined temperature (e.g., 10 degrees Celsius or 4 degrees Celsius) to the target container 190, the control circuit 480 controls the source selection device 430 to output the cold water received from the cooling device 424 of the temperature adjustment device 420. In addition, the control circuit 480 turns on the switch device 470, so that the cold water can pass through the switch device 470 and flow to the flow direction control device 440.

In operations, the cooling device 424 of the temperature adjustment device 420 may need to take a certain time to chill the received water, so as to generate cold water having a sufficient low temperature. In this situation, the control circuit 480 controls the operation of the flow direction control device 440 (i.e., the water output direction of the flow direction control device 440) according to the temperature of the cold water.

Specifically, before the control circuit 480 determines that the temperature of the cold water reaches the second predetermined temperature, the control circuit 480 controls the flow direction control device 440 to block the first output terminal and to guide the cold water to flow toward the water drainage port 404 through the second output terminal, so as to prevent the target nozzle 150 from dispensing the cold water with wrong temperature into the target container 190.

Afterwards, when the control circuit 480 determines that the temperature of the cold water reaches the second predetermined temperature, the control circuit 480 controls the flow direction control device 440 to guide the cold water to flow toward the target nozzle 150 through the first output terminal, so that the target nozzle 150 can dispense cold water having a desired low temperature into the target container 190.

Please note that the component structure and connections between components of the temperature-adjusted water dispensing device in the aforementioned FIG. 4 is merely an exemplary embodiment, rather than a restriction to the practical implementations of the temperature-adjusted water dispensing device of the fluid material dispensing apparatus 100.

For example, some different embodiments of the temperature-adjusted water dispensing device are shown in FIG. 5 through FIG. 12.

Figure 5:
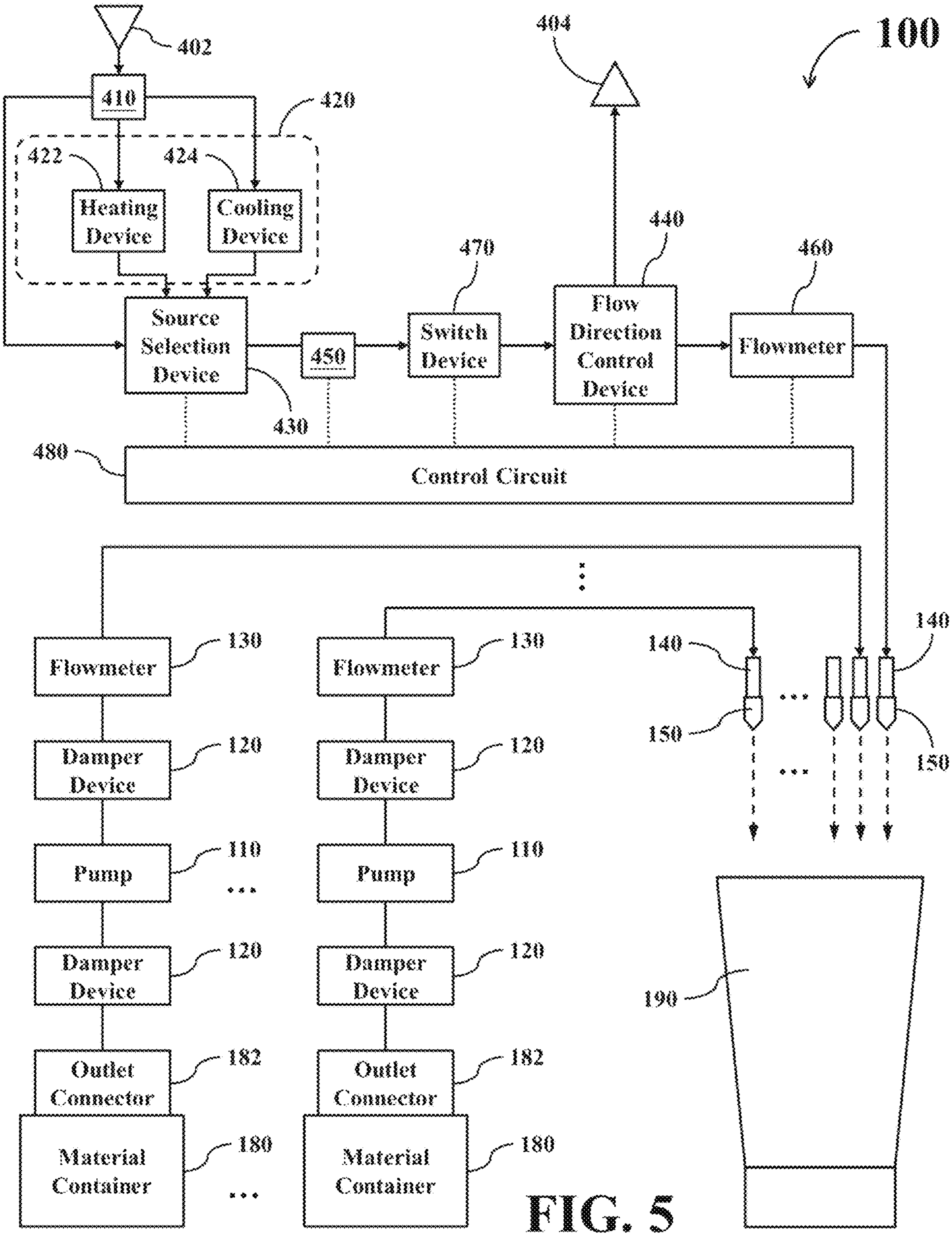
FIG. 5 shows a simplified functional block diagram of some components of the fluid material dispensing apparatus of FIG. 1 according to a second embodiment of the present disclosure.

In the embodiment of FIG. 5, the temperature sensor 450 is positioned between the water output terminal of the source selection device 430 and the switch device 470, and arranged to operably sense the temperature of the temperature-adjusted water.

In addition, the flowmeter 460 may be instead arranged at any appropriate position between the temperature adjustment device 420 and the input terminal of the flow direction control device 440.

Figure 6:
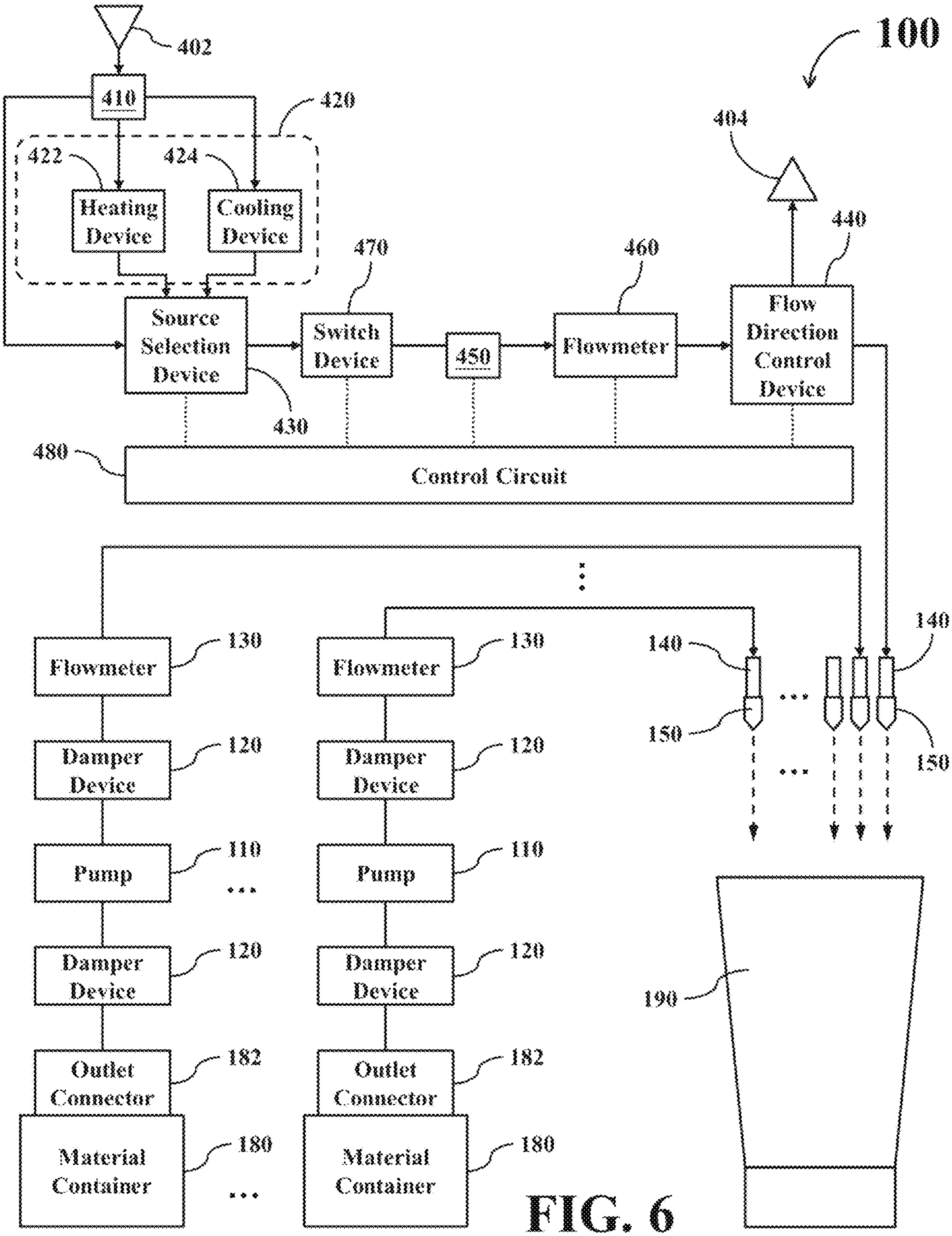
FIG. 6 shows a simplified functional block diagram of some components of the fluid material dispensing apparatus of FIG. 1 according to a third embodiment of the present disclosure.

For example, in the embodiment of FIG. 6, the flowmeter 460 is coupled between the switch device 470 and the first output terminal of the flow direction control device 440, and arranged to operably measure a flow of water (i.e., the temperature-adjusted water or the water without temperature adjustment) to be dispensed to the target container 190. In this embodiment, the temperature sensor 450 is positioned between the switch device 470 and the flowmeter 460, and arranged to operably sense the temperature of the temperature-adjusted water.

Figure 7:
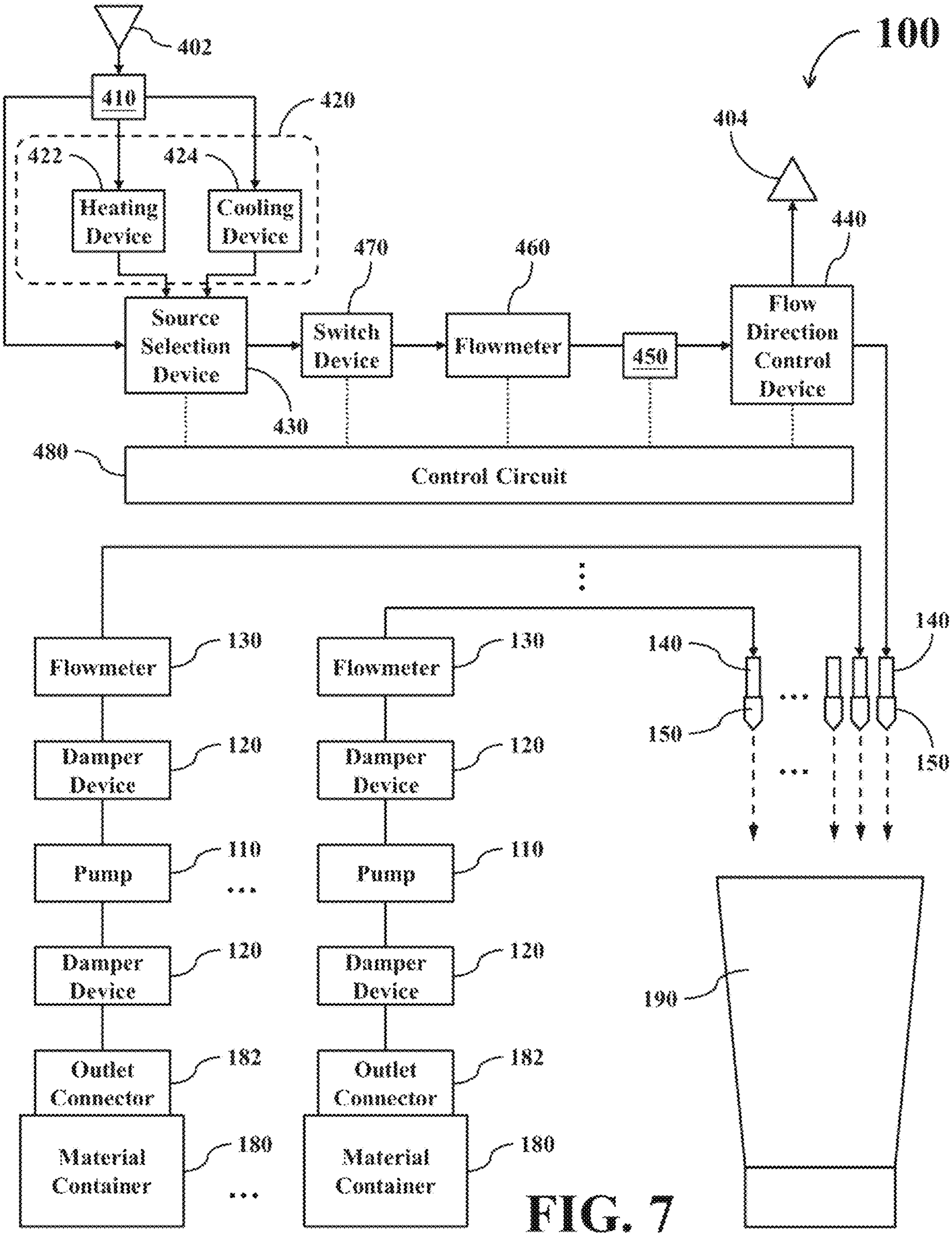
FIG. 7 shows a simplified functional block diagram of some components of the fluid material dispensing apparatus of FIG. 1 according to a fourth embodiment of the present disclosure.

In the embodiment of FIG. 7, the flowmeter 460 is coupled between the switch device 470 and the first output terminal of the flow direction control device 440, and arranged to operably measure a flow of water (i.e., the temperature-adjusted water or the water without temperature adjustment) to be dispensed to the target container 190. In addition, the temperature sensor 450 is positioned between the flowmeter 460 and the input terminal of the flow direction control device 440, and arranged to operably sense the temperature of the temperature-adjusted water.

Figure 8:
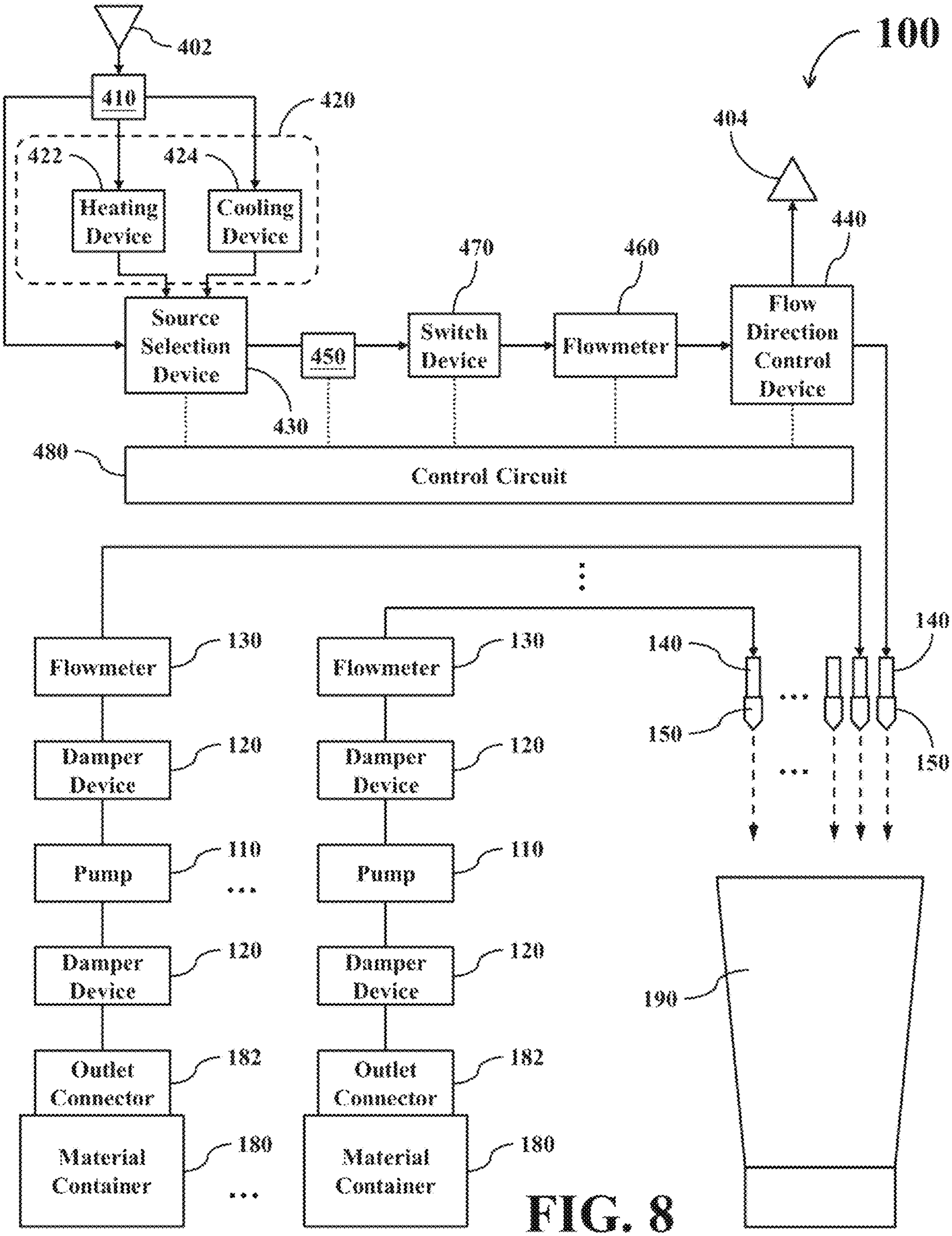
FIG. 8 shows a simplified functional block diagram of some components of the fluid material dispensing apparatus of FIG. 1 according to a fifth embodiment of the present disclosure.

In the embodiment of FIG. 8, the flowmeter 460 is coupled between the switch device 470 and the first output terminal of the flow direction control device 440, and arranged to operably measure a flow of water (i.e., the temperature-adjusted water or the water without temperature adjustment) to be dispensed to the target container 190. In addition, the temperature sensor 450 is positioned between the water output terminal of the source selection device 430 and the switch device 470, and arranged to operably sense the temperature of the temperature-adjusted water.

Figure 9:
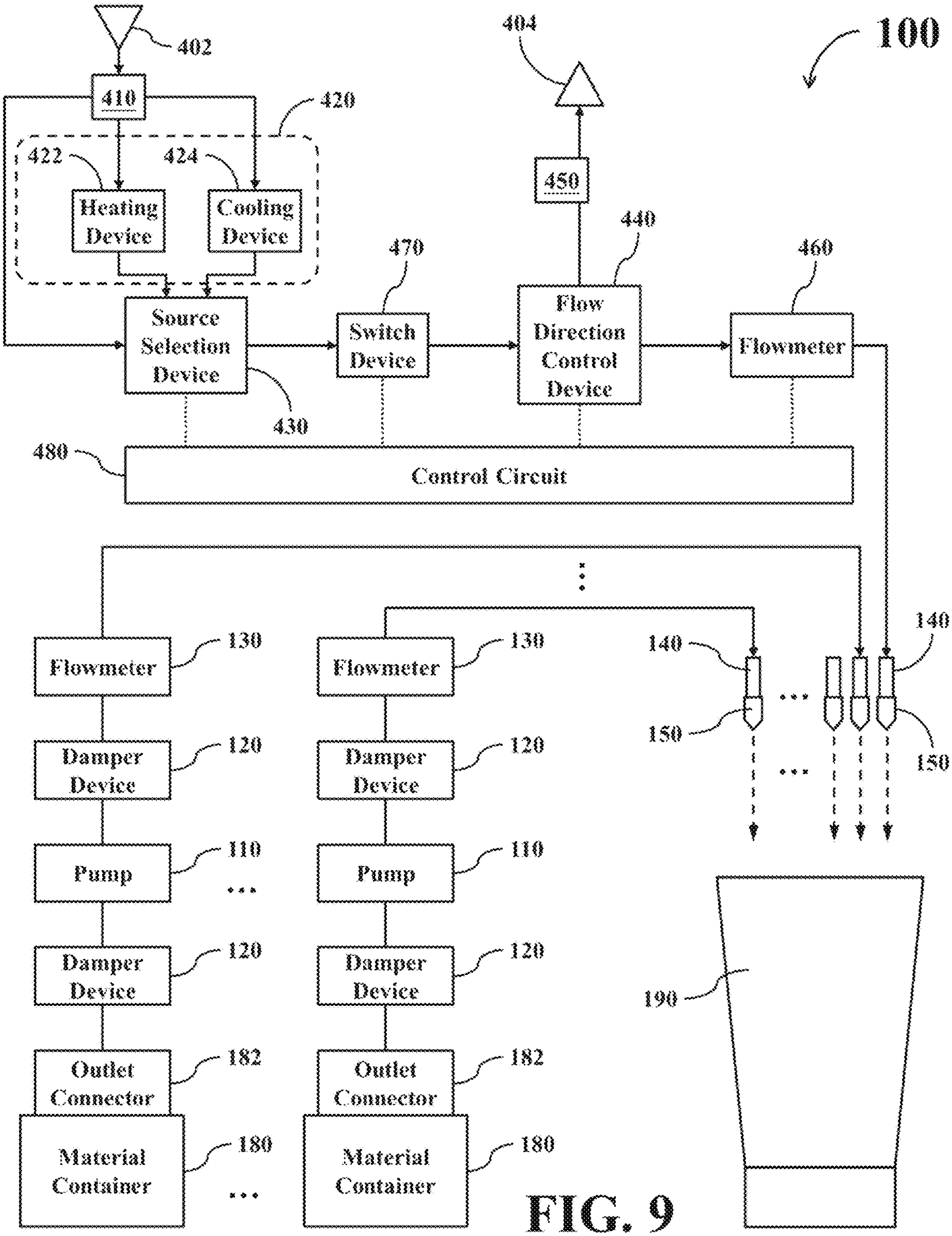
FIG. 9 shows a simplified functional block diagram of some components of the fluid material dispensing apparatus of FIG. 1 according to a sixth embodiment of the present disclosure.

In the embodiment of FIG. 9, the temperature sensor 450 is positioned between the second output terminal of the flow direction control device 440 and the water drainage port 404, and arranged to operably sense the temperature of the temperature-adjusted water transmitted from the second output terminal of the flow direction control device 440 to the water drainage port 404.

Figure 10:
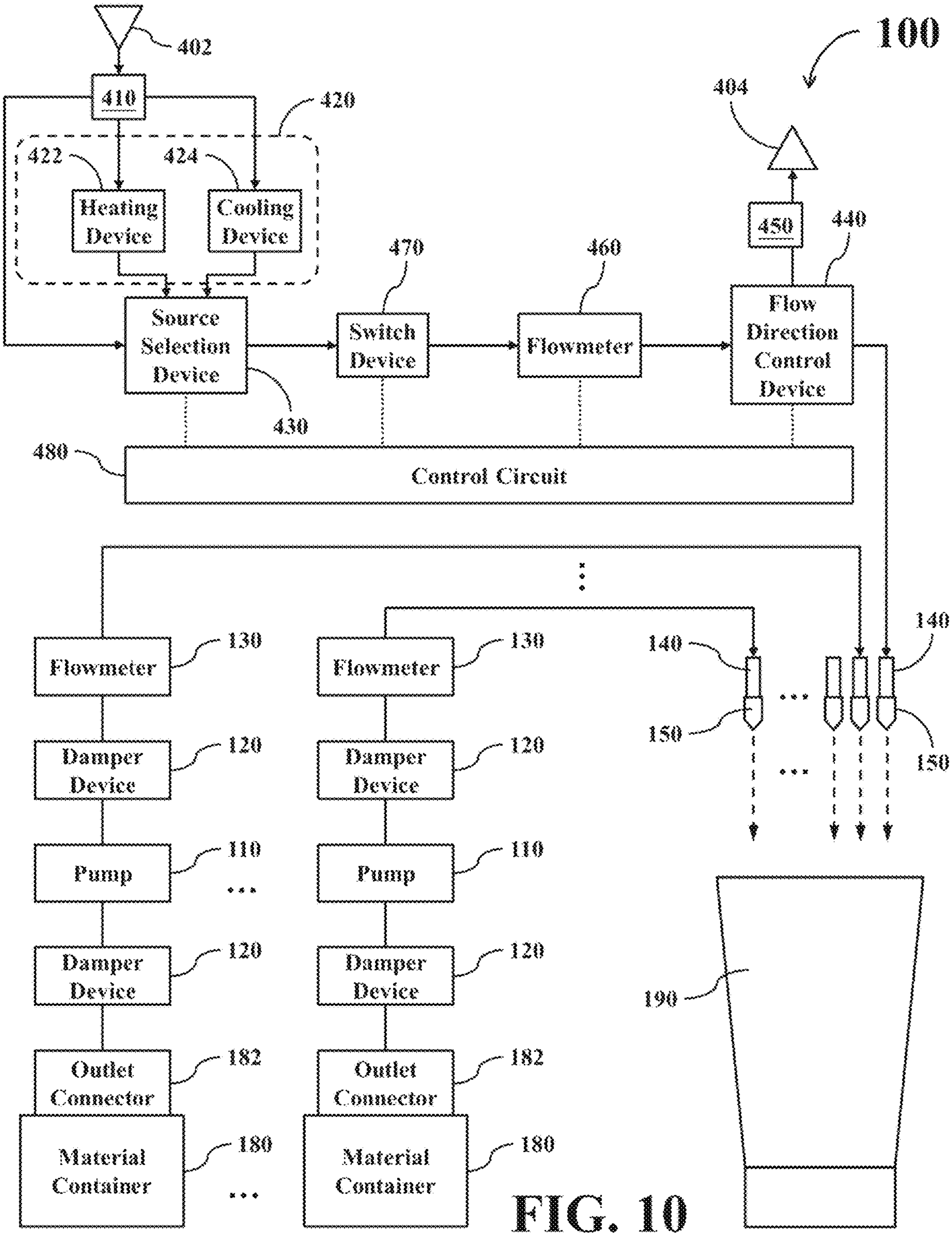
FIG. 10 shows a simplified functional block diagram of some components of the fluid material dispensing apparatus of FIG. 1 according to a seventh embodiment of the present disclosure.

In the embodiment of FIG. 10, the flowmeter 460 is coupled between the switch device 470 and the first output terminal of the flow direction control device 440, and arranged to operably measure a flow of water (i.e., the temperature-adjusted water or the water without temperature adjustment) to be dispensed to the target container 190. In addition, the temperature sensor 450 is positioned between the second output terminal of the flow direction control device 440 and the water drainage port 404, and arranged to operably sense the temperature of the temperature-adjusted water transmitted from the second output terminal of the flow direction control device 440 to the water drainage port 404.

Figure 11:
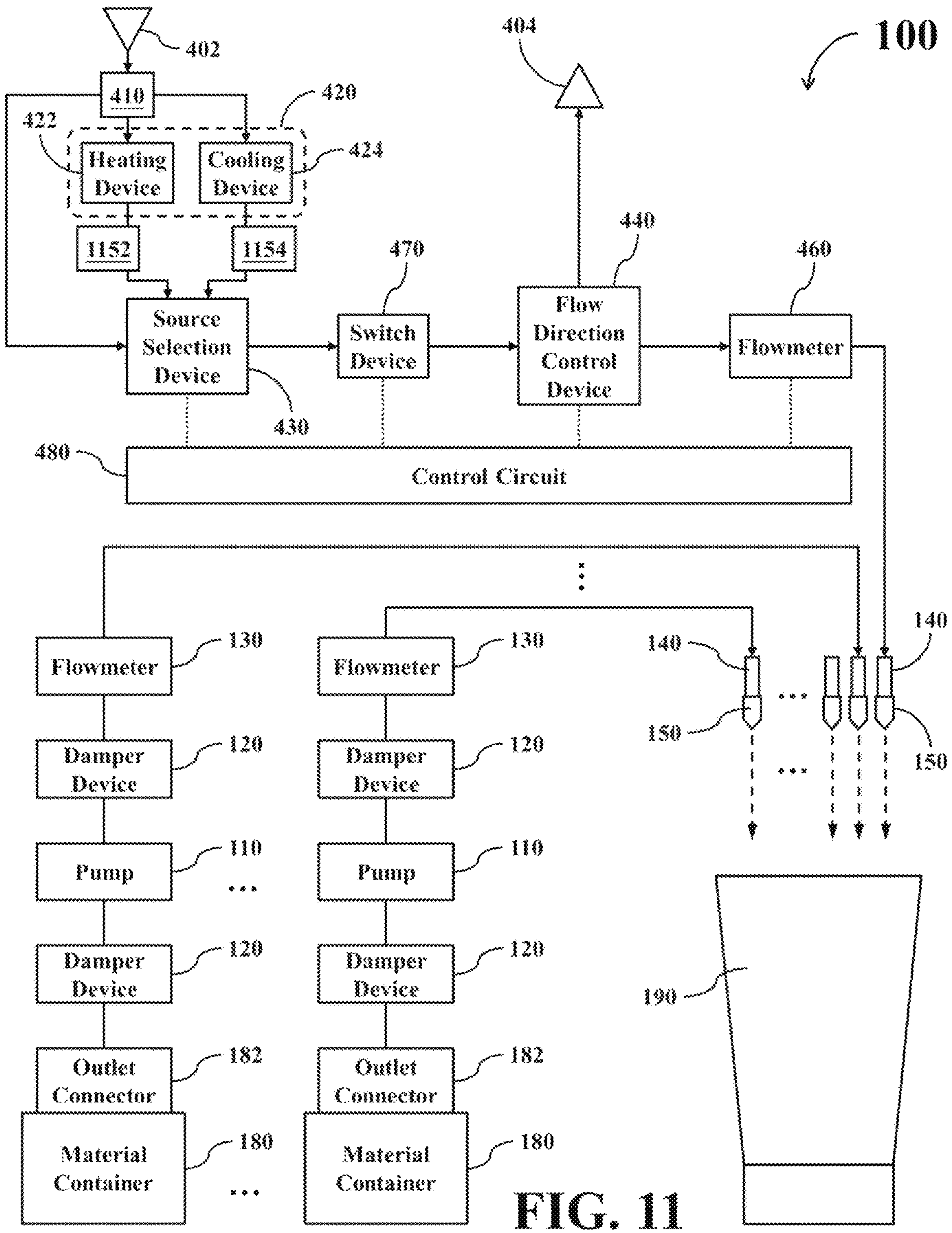
FIG. 11 shows a simplified functional block diagram of some components of the fluid material dispensing apparatus of FIG. 1 according to an eighth embodiment of the present disclosure.

In the embodiment of FIG. 11, the aforementioned temperature sensor 450 is replaced with two temperature sensors 1152 and 1154. The temperature sensor 1152 is coupled with the control circuit 480, and positioned between the output of the heating device 422 and the second water input terminal of the source selection device 430, and arranged to operably sense the temperature of the hot water transmitted from the heating device 422 to the source selection device 430. The temperature sensor 1154 is coupled with the control circuit 480, and positioned between the output of the cooling device 424 and the third water input terminal of the source selection device 430, and arranged to operably sense the temperature of the cold water transmitted from the cooling device 424 to the source selection device 430.

In other words, the temperature-adjusted water dispensing device may utilize two or more temperature sensors to sense the temperature of the temperature-adjusted water to be transmitted to the flow direction control device 440.

Figure 12:
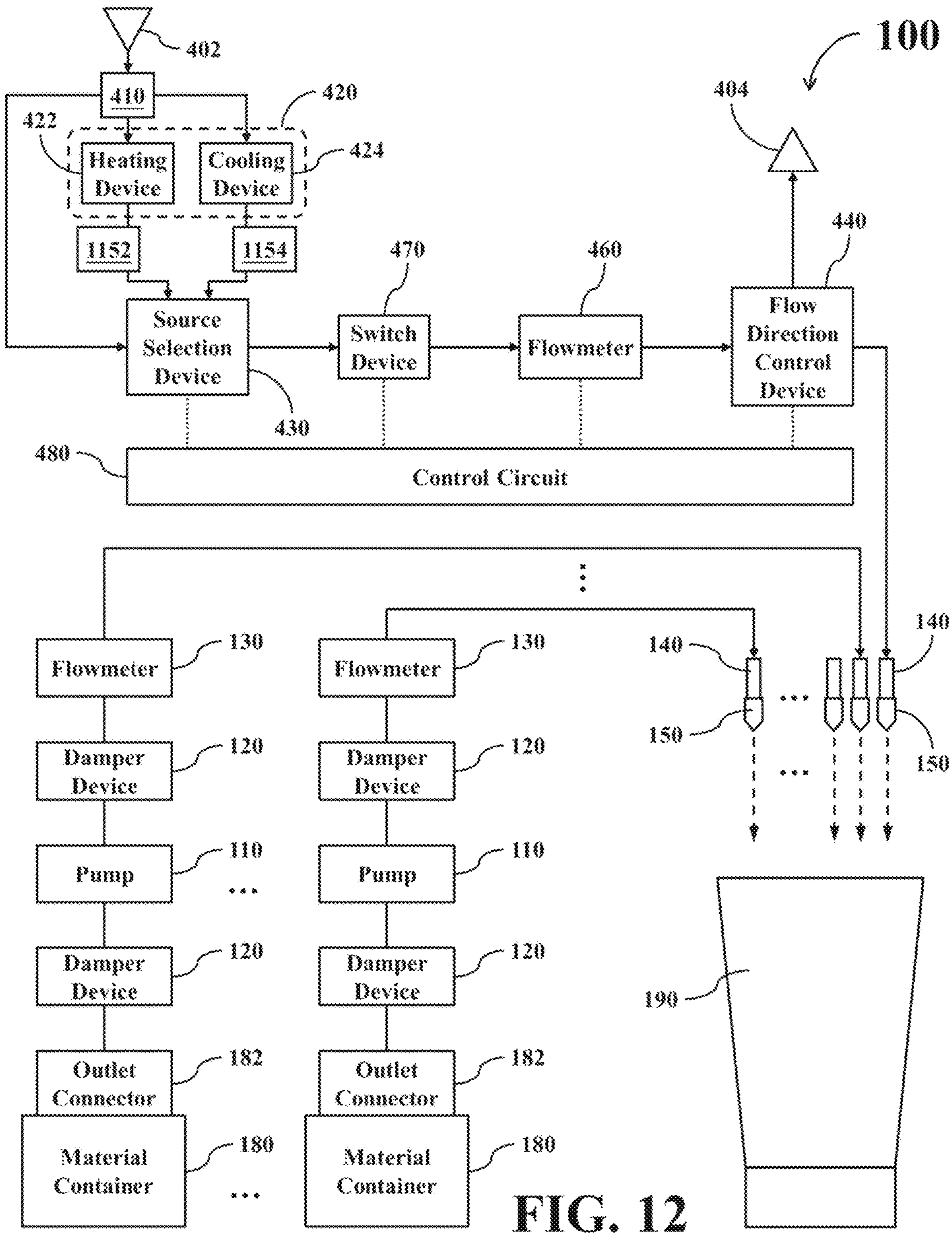
FIG. 12 shows a simplified functional block diagram of some components of the fluid material dispensing apparatus of FIG. 1 according to a ninth embodiment of the present disclosure.

In the embodiment of FIG. 12, the flowmeter 460 is coupled between the switch device 470 and the first output terminal of the flow direction control device 440, and arranged to operably measure a flow of water (i.e., the temperature-adjusted water or the water without temperature adjustment) to be dispensed to the target container 190. Similar to the embodiment of FIG. 11, the temperature-adjusted water dispensing device of FIG. 12 utilizes two temperature sensors 1152 and 1154 to replace the temperature sensor 450. The temperature sensor 1152 is coupled with the control circuit 480, and positioned between the output of the heating device 422 and the second water input terminal of the source selection device 430, and arranged to operably sense the temperature of the hot water transmitted from the heating device 422 to the source selection device 430. The temperature sensor 1154 is coupled with the control circuit 480, and positioned between the output of the cooling device 424 and the third water input terminal of the source selection device 430, and arranged to operably sense the temperature of the cold water transmitted from the cooling device 424 to the source selection device 430.

The foregoing descriptions regarding the implementations, connections, operations, and related advantages of other corresponding functional blocks of the fluid material dispensing apparatus 100 in FIG. 1 through FIG. 4 are also applicable to the fluid material dispensing apparatus 100 in FIG. 5 through FIG. 12. For the sake of brevity, those descriptions will not be repeated here.

In addition, the temperature-adjusted water dispensing device of the fluid material dispensing apparatus 100 may adopt other mechanisms for estimating the temperature of the temperature-adjusted water without using any temperature sensor.

Figure 13:
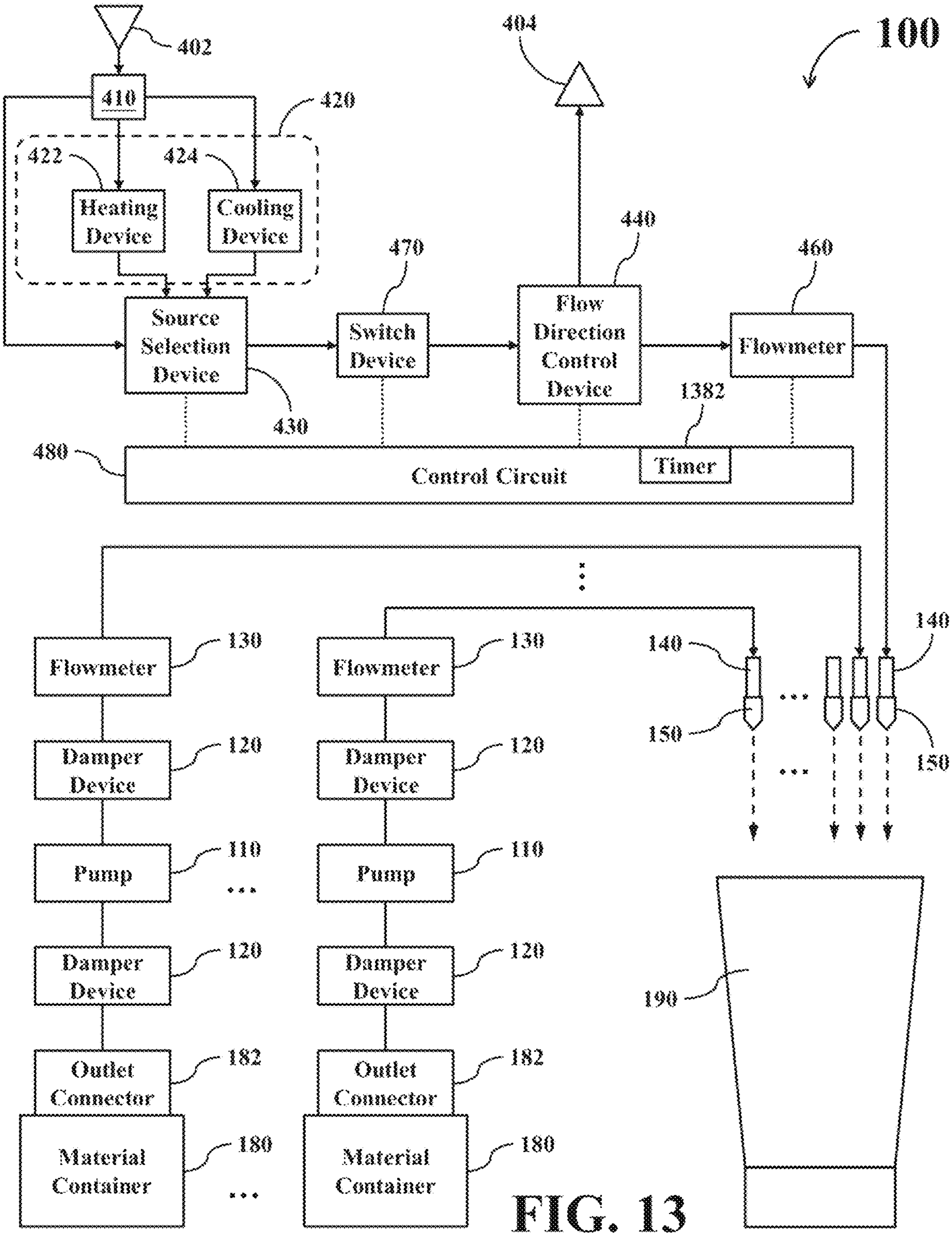
FIG. 13 shows a simplified functional block diagram of some components of the fluid material dispensing apparatus of FIG. 1 according to a tenth embodiment of the present disclosure.
Figure 14:
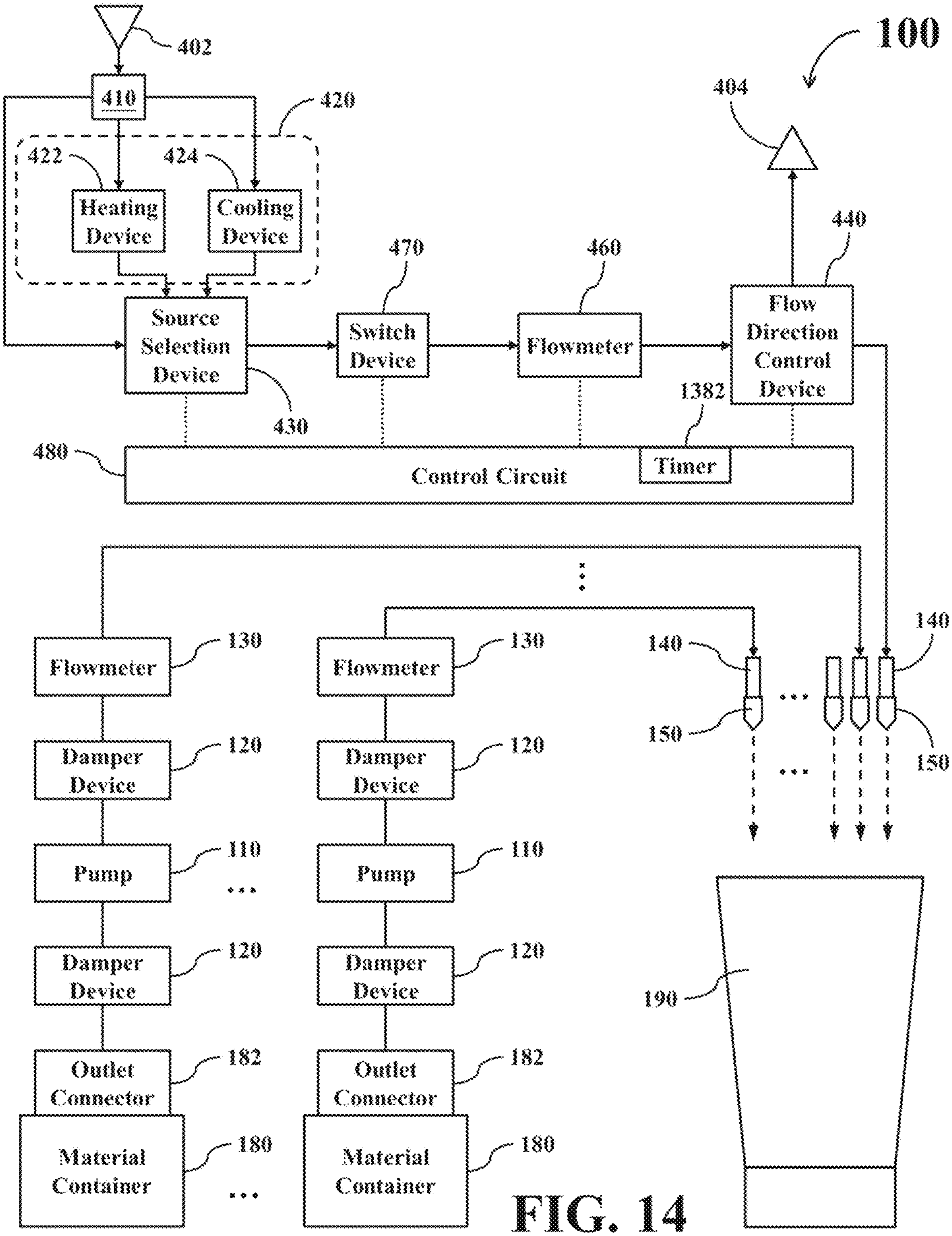
FIG. 14 shows a simplified functional block diagram of some components of the fluid material dispensing apparatus of FIG. 1 according to an eleventh embodiment of the present disclosure.

For example, FIG. 13 and FIG. 14 show simplified functional block diagrams of the fluid material dispensing apparatus 100 according to different embodiments of the present disclosure.

In the embodiments of FIG. 13 and FIG. 14, the temperature sensor 450 and the temperature sensors 1152 and 1154 described previously are omitted. Instead, as shown in FIG. 13 and FIG. 14, the control circuit 480 of the temperature-adjusted water dispensing device further comprises a timer 1382.

The timer 1382 is arranged to operably record a duration of time for operation of a particular component of the temperature-adjusted water dispensing device, and to operably generate a corresponding time-length value. In practice, the timer 1382 may be realized with a physical circuit of the control circuit 480 or may be realized with a computer program executed by the control circuit 480.

In the embodiments of FIG. 13 and FIG. 14, for example, the timer 1382 may record a duration of time for operation of the temperature adjustment device 420 (e.g., a duration of time for operation of the heating device 422 or a duration of time for operation of the cooling device 424) to generate a corresponding time-length value.

For another example, the timer 1382 may record a duration of time for the source selection device 430 outputting the temperature-adjusted water to generate a corresponding time-length value.

For yet another example, the timer 1382 may record a duration of time for the flow direction control device 440 outputting the temperature-adjusted water to the water drainage port 404 to generate a corresponding time-length value.

For yet another example, the timer 1382 may record a duration of time for the switch device 470 outputting the temperature-adjusted water to generate a corresponding time-length value.

The temperature-adjusted water dispensing device of FIG. 14 is similar to the temperature-adjusted water dispensing device of FIG. 13. However, the flowmeter 460 in FIG. 14 is coupled between the switch device 470 and the first output terminal of the flow direction control device 440, and arranged to operably measure a flow of water (i.e., the temperature-adjusted water or the water without temperature adjustment) to be dispensed to the target container 190 through the flow direction control device 440. Accordingly, in the embodiment of FIG. 14, the timer 1382 may record a duration of time for the flowmeter 460 outputting the temperature-adjusted water to generate a corresponding time-length value.

When the fluid material dispensing apparatus 100 requires the temperature-adjusted water dispensing device to add temperature-adjusted water to the target container 190, the control circuit 480 controls the source selection device 430 to output the temperature-adjusted water received from the temperature adjustment device 420. In addition, the control circuit 480 may turn on the switch device 470, so that the temperature-adjusted water can pass through the switch device 470 and flow to the flow direction control device 440.

As described previously, the temperature adjustment device 420 may need to take a certain time to increase or decrease the temperature of received water, so that the resulting temperature-adjusted water can reach a required temperature. In this situation, the control circuit 480 controls the flow direction control device 440 to block the first output terminal and to guide the temperature-adjusted water to flow toward the water drainage port 404 through the second output terminal.

Specifically, the control circuit 480 of the embodiments of FIG. 13 and FIG. 14 estimates the temperature of the temperature-adjusted water according to the time-length value generated by the timer 1382. For example, the control circuit 480 may determine that the temperature of the temperature-adjusted water reaches a predetermined temperature when the time-length value reaches a predetermined value, and the control circuit 480 may determine that the temperature of the temperature-adjusted water does not yet reach the predetermined temperature before the time-length value reaches the predetermined value.

Before the control circuit 480 determines that the temperature of the temperature-adjusted water reaches the predetermined temperature (i.e., before the time-length value reaches the predetermined value in this embodiment), the control circuit 480 controls the flow direction control device 440 to continue blocking the first output terminal and to continue guiding the temperature-adjusted water to flow toward the water drainage port 404 through the second output terminal, so that the temperature-adjusted water can be discharged to outside the fluid material dispensing apparatus 100 through the water drainage port 404. Aa a result, the temperature-adjusted water dispensing device can prevent the target nozzle 150 from dispensing the temperature-adjusted water having an incorrect temperature into the target container 190.

Afterwards, when the time-length value reaches the predetermined value, the control circuit 480 determines that the temperature of the temperature-adjusted water reaches the predetermined temperature, and would thus control the flow direction control device 440 to guide the temperature-adjusted water to flow toward the target nozzle 150 through the first output terminal, so that the target nozzle 150 can dispense the temperature-adjusted water into the target container 190.

For example, when the fluid material dispensing apparatus 100 requires the temperature-adjusted water dispensing device to add hot water having a first predetermined temperature (e.g., 80 degrees Celsius or 90 degrees Celsius) to the target container 190, the control circuit 480 controls the source selection device 430 to output the hot water received from the heating device 422 of the temperature adjustment device 420. In addition, the control circuit 480 turns on the switch device 470, so that the hot water can pass through the switch device 470 and flow to the flow direction control device 440. In this stage, the control circuit 480 controls the flow direction control device 440 to block the first output terminal and to guide the temperature-adjusted water to flow toward the water drainage port 404 through the second output terminal.

In operations, the heating device 422 of the temperature adjustment device 420 may need to take a certain time to heat the received water, so as to generate hot water having a sufficient high temperature. In this situation, the control circuit 480 estimates the temperature of the hot water according to the time-length value generated by the timer 1382, and controls the operation of the flow direction control device 440 (i.e., the water output direction of the flow direction control device 440) according to the temperature of the hot water.

Specifically, before the control circuit 480 determines that the temperature of the hot water reaches the first predetermined temperature (i.e., before the time-length value generated by the timer 1382 reaches a first predetermined value in this embodiment), the control circuit 480 controls the flow direction control device 440 to continue blocking the first output terminal and to continue guiding the hot water to flow toward the water drainage port 404 through the second output terminal, so as to prevent the target nozzle 150 from dispensing hot water with wrong temperature into the target container 190.

Afterwards, when the time-length value generated by the timer 1382 reaches the first predetermined value, the control circuit 480 determines that the temperature of the hot water reaches the first predetermined temperature, and the control circuit 480 would control the flow direction control device 440 to guide the hot water to flow toward the target nozzle 150 through the first output terminal, so that the target nozzle 150 can dispense hot water having a desired high temperature into the target container 190.

For another example, when the fluid material dispensing apparatus 100 requires the temperature-adjusted water dispensing device to add cold water having a second predetermined temperature (e.g., 10 degrees Celsius or 4 degrees Celsius) to the target container 190, the control circuit 480 controls the source selection device 430 to output the cold water received from the cooling device 424 of the temperature adjustment device 420. In addition, the control circuit 480 turns on the switch device 470, so that the cold water can pass through the switch device 470 and flow to the flow direction control device 440. In this stage, the control circuit 480 controls the flow direction control device 440 to block the first output terminal and to guide the temperature-adjusted water to flow toward the water drainage port 404 through the second output terminal.

In operations, the cooling device 424 of the temperature adjustment device 420 may need to take a certain time to chill the received water, so as to generate cold water having a sufficient low temperature. In this situation, the control circuit 480 estimates the temperature of the cold water according to the time-length value generated by the timer 1382, and controls the operation of the flow direction control device 440 (i.e., the water output direction of the flow direction control device 440) according to the temperature of the cold water.

Specifically, before the control circuit 480 determines that the temperature of the cold water reaches the second predetermined temperature (i.e., before the time-length value generated by the timer 1382 reaches a second predetermined value in this embodiment), the control circuit 480 controls the flow direction control device 440 to continue blocking the first output terminal and to continue guiding the cold water to flow toward the water drainage port 404 through the second output terminal, so as to prevent the target nozzle 150 from dispensing cold water with wrong temperature into the target container 190.

Afterwards, when the time-length value generated by the timer 1382 reaches the second predetermined value, the control circuit 480 determines that the temperature of the cold water reaches the second predetermined temperature, and the control circuit 480 would control the flow direction control device 440 to guide the cold water to flow toward the target nozzle 150 through the first output terminal, so that the target nozzle 150 can dispense cold water having a desired low temperature into the target container 190.

The foregoing descriptions regarding the implementations, connections, operations, and related advantages of other corresponding functional blocks of the fluid material dispensing apparatus 100 of FIG. 1 through FIG. 4 are also applicable to the embodiments of FIG. 13 and FIG. 14. For the sake of brevity, those descriptions will not be repeated here.

In some embodiments, the temperature-adjusted water dispensing device may measure the flow of the temperature-adjusted water outputted by the temperature adjustment device 420, and estimate the temperature of the temperature-adjusted water according to the flow measurement result without using any temperature sensor and timer.

Figure 15:
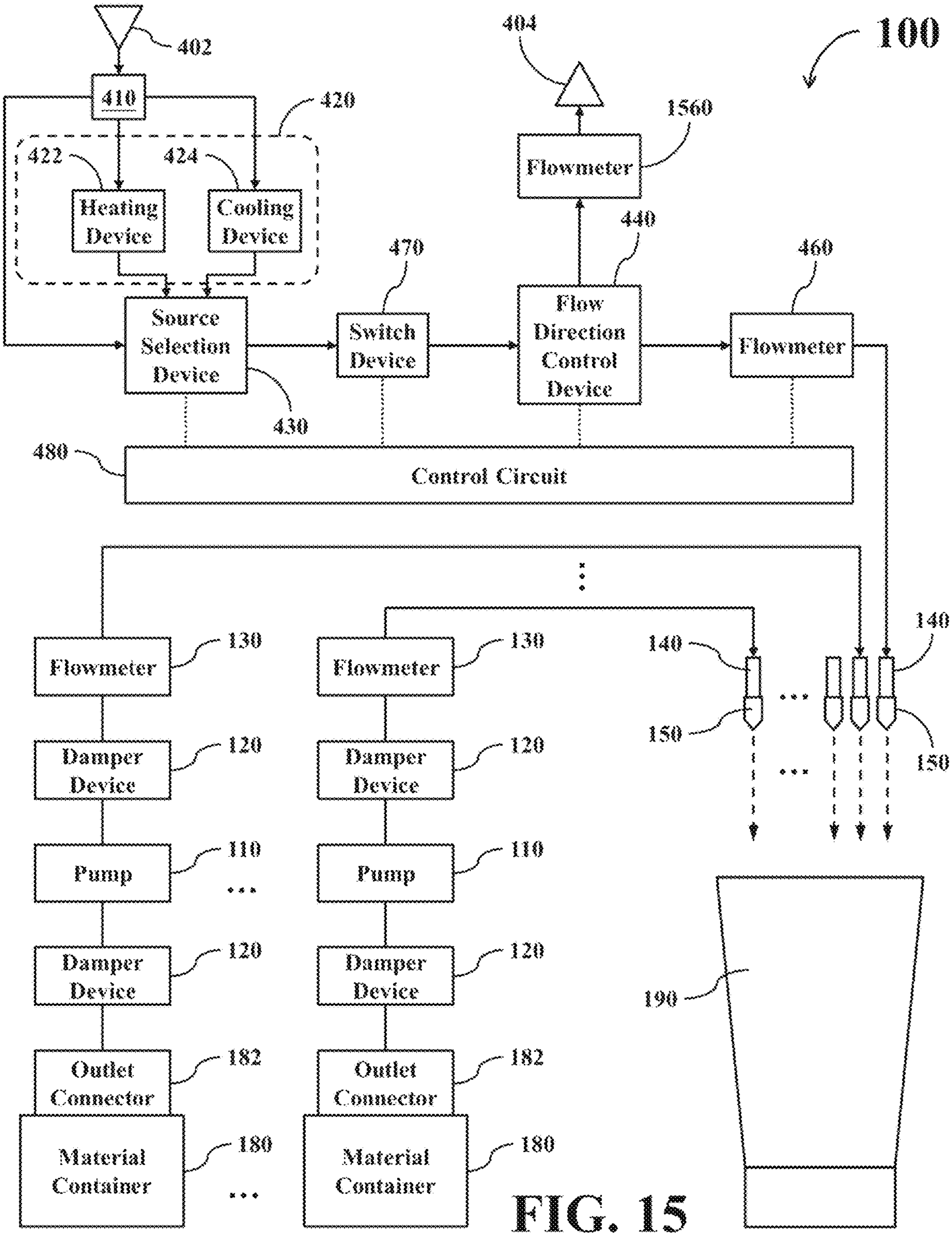
FIG. 15 shows a simplified functional block diagram of some components of the fluid material dispensing apparatus of FIG. 1 according to a twelfth embodiment of the present disclosure.
Figure 16:
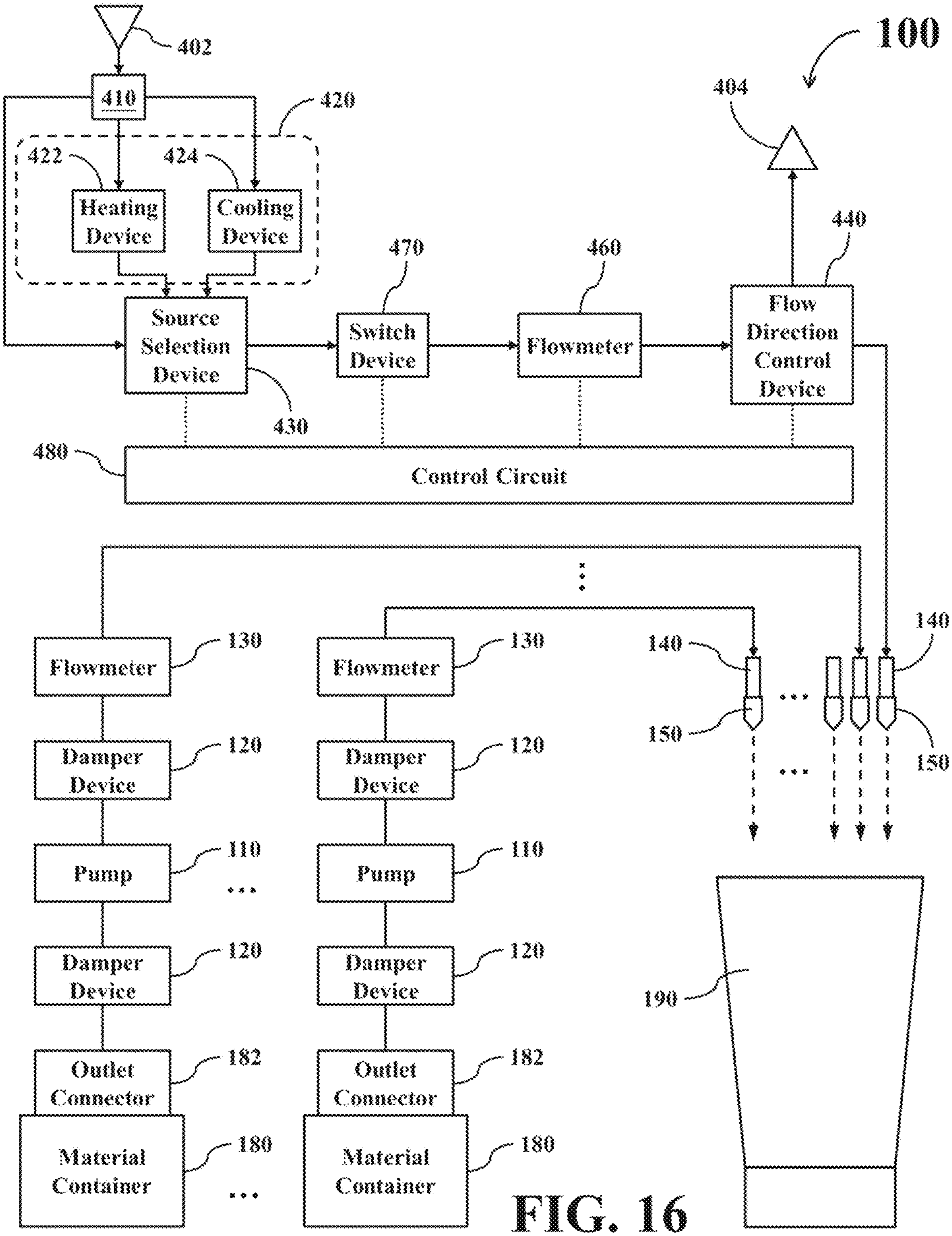
FIG. 16 shows a simplified functional block diagram of some components of the fluid material dispensing apparatus of FIG. 1 according to a thirteenth embodiment of the present disclosure.

For example, FIG. 15 and FIG. 16 show simplified functional block diagrams of the fluid material dispensing apparatus 100 according to different embodiments of the present disclosure.

In the embodiment of FIG. 15, the temperature-adjusted water dispensing device further comprises a flowmeter 1560. The flowmeter 1560 is coupled with the control circuit 480, and coupled between the second output terminal of the flow direction control device 440 and the water drainage port 404, and arranged to operably measure a flow of the temperature-adjusted water transmitted from the flow direction control device 440 to the water drainage port 404 to generate a measurement value, which is corresponding to the flow of the temperature-adjusted water outputted by the temperature adjustment device 420.

When the fluid material dispensing apparatus 100 requires the temperature-adjusted water dispensing device to add temperature-adjusted water to the target container 190, the control circuit 480 controls the source selection device 430 to output the temperature-adjusted water received from the temperature adjustment device 420. In addition, the control circuit 480 may turn on the switch device 470, so that the temperature-adjusted water can pass through the switch device 470 and flow to the flow direction control device 440.

As described previously, the temperature adjustment device 420 may need to take a certain time to increase or decrease the temperature of received water, so that the resulting temperature-adjusted water can reach a required temperature. In this situation, the control circuit 480 controls the flow direction control device 440 to block the first output terminal and to guide the temperature-adjusted water to flow toward the water drainage port 404 through the second output terminal.

Then, the control circuit 480 of the embodiments of FIG. 15 estimates the temperature of the temperature-adjusted water according to the measurement value generated by the flowmeter 1560. For example, the control circuit 480 may determine that the temperature of the temperature-adjusted water reaches a predetermined temperature when the measurement value reaches a predetermined threshold, and the control circuit 480 may determine that the temperature of the temperature-adjusted water does not yet reach the predetermined temperature before the measurement value reaches the predetermined threshold.

Before the control circuit 480 determines that the temperature of the temperature-adjusted water reaches the predetermined temperature (i.e., before the measurement value reaches the predetermined threshold in this embodiment), the control circuit 480 controls the flow direction control device 440 to continue blocking the first output terminal and to continue guiding the temperature-adjusted water to flow toward the water drainage port 404 through the second output terminal, so that the temperature-adjusted water can be discharged to outside the fluid material dispensing apparatus 100 through the water drainage port 404. Aa a result, the temperature-adjusted water dispensing device can prevent the target nozzle 150 from dispensing the temperature-adjusted water having an incorrect temperature into the target container 190.

Afterwards, when the measurement value reaches the predetermined threshold, the control circuit 480 determines that the temperature of the temperature-adjusted water reaches the predetermined temperature, and would thus control the flow direction control device 440 to guide the temperature-adjusted water to flow toward the target nozzle 150 through the first output terminal, so that the target nozzle 150 can dispense the temperature-adjusted water into the target container 190.

For example, when the fluid material dispensing apparatus 100 of FIG. 15 requires the temperature-adjusted water dispensing device to add hot water having a first predetermined temperature (e.g., 80 degrees Celsius or 90 degrees Celsius) to the target container 190, the control circuit 480 controls the source selection device 430 to output the hot water received from the heating device 422 of the temperature adjustment device 420. In addition, the control circuit 480 turns on the switch device 470, so that the hot water can pass through the switch device 470 and flow to the flow direction control device 440. In this stage, the control circuit 480 controls the flow direction control device 440 to block the first output terminal and to guide the temperature-adjusted water to flow toward the water drainage port 404 through the second output terminal.

In operations, the heating device 422 of the temperature adjustment device 420 may need to take a certain time to heat the received water, so as to generate hot water having a sufficient high temperature. In this situation, the control circuit 480 estimates the temperature of the hot water according to the measurement value generated by the flowmeter 1560, and controls the operation of the flow direction control device 440 (i.e., the water output direction of the flow direction control device 440) according to the temperature of the hot water.

Specifically, before the control circuit 480 determines that the temperature of the hot water reaches the first predetermined temperature (i.e., before the measurement value generated by the flowmeter 1560 reaches a first predetermined threshold in this embodiment), the control circuit 480 controls the flow direction control device 440 to continue blocking the first output terminal and to continue guiding the hot water to flow toward the water drainage port 404 through the second output terminal, so as to prevent the target nozzle 150 from dispensing hot water with wrong temperature into the target container 190.

Afterwards, when the measurement value generated by the flowmeter 1560 reaches the first predetermined threshold, the control circuit 480 determines that the temperature of the hot water reaches the first predetermined temperature, and the control circuit 480 would control the flow direction control device 440 to guide the hot water to flow toward the target nozzle 150 through the first output terminal, so that the target nozzle 150 can dispense hot water having a desired high temperature into the target container 190.

For another example, when the fluid material dispensing apparatus 100 of FIG. 15 requires the temperature-adjusted water dispensing device to add cold water having a second predetermined temperature (e.g., 10 degrees Celsius or 4 degrees Celsius) to the target container 190, the control circuit 480 controls the source selection device 430 to output the cold water received from the cooling device 424 of the temperature adjustment device 420. In addition, the control circuit 480 turns on the switch device 470, so that the cold water can pass through the switch device 470 and flow to the flow direction control device 440. In this stage, the control circuit 480 controls the flow direction control device 440 to block the first output terminal and to guide the temperature-adjusted water to flow toward the water drainage port 404 through the second output terminal.

In operations, the cooling device 424 of the temperature adjustment device 420 may need to take a certain time to chill the received water, so as to generate cold water having a sufficient low temperature. In this situation, the control circuit 480 estimates the temperature of the cold water according to the measurement value generated by the flowmeter 1560, and controls the operation of the flow direction control device 440 (i.e., the water output direction of the flow direction control device 440) according to the temperature of the cold water.

Specifically, before the control circuit 480 determines that the temperature of the cold water reaches the second predetermined temperature (i.e., before the measurement value generated by the flowmeter 1560 reaches a second predetermined threshold in this embodiment), the control circuit 480 controls the flow direction control device 440 to continue blocking the first output terminal and to continue guiding the cold water to flow toward the water drainage port 404 through the second output terminal, so as to prevent the target nozzle 150 from dispensing cold water with wrong temperature into the target container 190.

Afterwards, when the measurement value generated by the flowmeter 1560 reaches the second predetermined threshold, the control circuit 480 determines that the temperature of the cold water reaches the second predetermined temperature, and the control circuit 480 would control the flow direction control device 440 to guide the cold water to flow toward the target nozzle 150 through the first output terminal, so that the target nozzle 150 can dispense cold water having a desired low temperature into the target container 190.

It can be appreciated form the foregoing descriptions that the temperature-adjusted water dispensing device of FIG. 15 does not need to utilize any temperature sensor to sense the temperature of the temperature-adjusted water, nor does it need to utilize any timer to estimate the temperature of the temperature-adjusted water.

FIG. 16 shows another embodiment of the temperature-adjusted water dispensing device. The temperature-adjusted water dispensing device of FIG. 16 is similar to the temperature-adjusted water dispensing device of FIG. 15. However, the arrangement and role of the flowmeter 460 of FIG. 16 are different from the flowmeter 460 of FIG. 15.

As described previously, the flowmeter 460 may be arranged at any appropriate position between the temperature adjustment device 420 and the input terminal of the flow direction control device 440. For example, in the embodiment of FIG. 16, the flowmeter 460 is coupled between the switch device 470 and the input terminal of the flow direction control device 440, and arranged to operably measure a flow of water (i.e., the temperature-adjusted water or the water without temperature adjustment) to be dispensed to the target container 190.

In another aspect, the flowmeter 460 of FIG. 16 can be utilized to measure a flow of the temperature-adjusted water to be transmitted to the flow direction control device 440 to generate a measurement value, which is corresponding to the flow of the temperature-adjusted water outputted by the temperature adjustment device 420.

In the embodiment of FIG. 16, when the fluid material dispensing apparatus 100 requires the temperature-adjusted water dispensing device to add temperature-adjusted water to the target container 190, the control circuit 480 controls the source selection device 430 to output the temperature-adjusted water received from the temperature adjustment device 420. In addition, the control circuit 480 may turn on the switch device 470, so that the temperature-adjusted water can pass through the switch device 470 and flow to the flow direction control device 440.

As described previously, the temperature adjustment device 420 may need to take a certain time to increase or decrease the temperature of received water, so that the resulting temperature-adjusted water can reach a required temperature. In this situation, the control circuit 480 controls the flow direction control device 440 to block the first output terminal and to guide the temperature-adjusted water to flow toward the water drainage port 404 through the second output terminal.

Then, the control circuit 480 of the embodiments of FIG. 16 estimates the temperature of the temperature-adjusted water according to the measurement value generated by the flowmeter 460. For example, the control circuit 480 may determine that the temperature of the temperature-adjusted water reaches a predetermined temperature when the measurement value reaches a predetermined threshold, and the control circuit 480 may determine that the temperature of the temperature-adjusted water does not yet reach the predetermined temperature before the measurement value reaches the predetermined threshold.

Before the control circuit 480 determines that the temperature of the temperature-adjusted water reaches the predetermined temperature (i.e., before the measurement value reaches the predetermined threshold in this embodiment), the control circuit 480 controls the flow direction control device 440 to continue blocking the first output terminal and to continue guiding the temperature-adjusted water to flow toward the water drainage port 404 through the second output terminal, so that the temperature-adjusted water can be discharged to outside the fluid material dispensing apparatus 100 through the water drainage port 404. Aa a result, the temperature-adjusted water dispensing device can prevent the target nozzle 150 from dispensing the temperature-adjusted water having an incorrect temperature into the target container 190.

Afterwards, when the measurement value reaches the predetermined threshold, the control circuit 480 determines that the temperature of the temperature-adjusted water reaches the predetermined temperature, and would thus control the flow direction control device 440 to guide the temperature-adjusted water to flow toward the target nozzle 150 through the first output terminal, so that the target nozzle 150 can dispense the temperature-adjusted water into the target container 190.

For example, when the fluid material dispensing apparatus 100 of FIG. 16 requires the temperature-adjusted water dispensing device to add hot water having a first predetermined temperature (e.g., 80 degrees Celsius or 90 degrees Celsius) to the target container 190, the control circuit 480 controls the source selection device 430 to output the hot water received from the heating device 422 of the temperature adjustment device 420. In addition, the control circuit 480 turns on the switch device 470, so that the hot water can pass through the switch device 470 and flow to the flow direction control device 440. In this stage, the control circuit 480 controls the flow direction control device 440 to block the first output terminal and to guide the temperature-adjusted water to flow toward the water drainage port 404 through the second output terminal.

In operations, the heating device 422 of the temperature adjustment device 420 may need to take a certain time to heat the received water, so as to generate hot water having a sufficient high temperature. In this situation, the control circuit 480 estimates the temperature of the hot water according to the measurement value generated by the flowmeter 460, and controls the operation of the flow direction control device 440 (i.e., the water output direction of the flow direction control device 440) according to the temperature of the hot water.

Specifically, before the control circuit 480 determines that the temperature of the hot water reaches the first predetermined temperature (i.e., before the measurement value generated by the flowmeter 460 reaches a first predetermined threshold in this embodiment), the control circuit 480 controls the flow direction control device 440 to continue blocking the first output terminal and to continue guiding the hot water to flow toward the water drainage port 404 through the second output terminal, so as to prevent the target nozzle 150 from dispensing hot water with wrong temperature into the target container 190.

Afterwards, when the measurement value generated by the flowmeter 460 reaches the first predetermined threshold, the control circuit 480 determines that the temperature of the hot water reaches the first predetermined temperature, and the control circuit 480 would control the flow direction control device 440 to guide the hot water to flow toward the target nozzle 150 through the first output terminal, so that the target nozzle 150 can dispense hot water having a desired high temperature into the target container 190.

For another example, when the fluid material dispensing apparatus 100 of FIG. 16 requires the temperature-adjusted water dispensing device to add cold water having a second predetermined temperature (e.g., 10 degrees Celsius or 4 degrees Celsius) to the target container 190, the control circuit 480 controls the source selection device 430 to output the cold water received from the cooling device 424 of the temperature adjustment device 420. In addition, the control circuit 480 turns on the switch device 470, so that the cold water can pass through the switch device 470 and flow to the flow direction control device 440. In this stage, the control circuit 480 controls the flow direction control device 440 to block the first output terminal and to guide the temperature-adjusted water to flow toward the water drainage port 404 through the second output terminal.

In operations, the cooling device 424 of the temperature adjustment device 420 may need to take a certain time to chill the received water, so as to generate cold water having a sufficient low temperature. In this situation, the control circuit 480 estimates the temperature of the cold water according to the measurement value generated by the flowmeter 460, and controls the operation of the flow direction control device 440 (i.e., the water output direction of the flow direction control device 440) according to the temperature of the cold water.

Specifically, before the control circuit 480 determines that the temperature of the cold water reaches the second predetermined temperature (i.e., before the measurement value generated by the flowmeter 460 reaches a second predetermined threshold in this embodiment), the control circuit 480 controls the flow direction control device 440 to continue blocking the first output terminal and to continue guiding the cold water to flow toward the water drainage port 404 through the second output terminal, so as to prevent the target nozzle 150 from dispensing cold water with wrong temperature into the target container 190.

Afterwards, when the measurement value generated by the flowmeter 460 reaches the second predetermined threshold, the control circuit 480 determines that the temperature of the cold water reaches the second predetermined temperature, and the control circuit 480 would control the flow direction control device 440 to guide the cold water to flow toward the target nozzle 150 through the first output terminal, so that the target nozzle 150 can dispense cold water having a desired low temperature into the target container 190.

Apparently, the temperature-adjusted water dispensing device of FIG. 16 does not need to utilize any temperature sensor to sense the temperature of the temperature-adjusted water, nor does it need to utilize any timer to estimate the temperature of the temperature-adjusted water.

The foregoing descriptions regarding the implementations, connections, operations, and related advantages of other corresponding functional blocks of the fluid material dispensing apparatus 100 of FIG. 1 through FIG. 4 are also applicable to the embodiments of FIG. 15 and FIG. 16. For the sake of brevity, those descriptions will not be repeated here.

In the foregoing embodiments of FIG. 4 through FIG. 16, the temperature adjustment device 420 is an embedded in the temperature-adjusted water dispensing device of the fluid material dispensing apparatus 100, but this is merely an exemplary embodiment, rather than a restriction to the practical implementations of the fluid material dispensing apparatus 100.

For example, please refer to FIG. 17 through FIG. 21, which show simplified functional block diagrams of the fluid material dispensing apparatus 100 according to different embodiments of the present disclosure. In FIG. 17 through FIG. 21, the fluid material dispensing apparatus 100 utilizes an external temperature adjustment device 1720 to replace the aforementioned temperature adjustment device 420. That is, the fluid material dispensing apparatus 100 of FIG. 17 through FIG. 21 uses the temperature-adjusted water produced by the external temperature adjustment device 1720 in making beverages.

In the embodiments of FIG. 17 through FIG. 21, the temperature-adjusted water dispensing device comprises the water input port 402, the water drainage port 404, the source selection device 430, the flow direction control device 440, the flowmeter 460, the switch device 470, and the control circuit 480. In order to reduce the complexity of the drawing contents, other structures and devices of the fluid material dispensing apparatus 100 are not shown in FIG. 17 through FIG. 21.

As shown in FIG. 17 through FIG. 21, the external temperature adjustment device 1720 comprises a fluid diverter 1710, a heating device 422, and a cooling device 424.

The fluid diverter 1710 has one water input terminal and two water output terminals. The water input terminal of the fluid diverter 1710 is coupled with a water input port 1702 through various appropriate connectors and/or pipes to water transmitted from the water input port 1702. The fluid diverter 1710 is arranged to operably output the received water through the water output terminals. In practice, the fluid diverter 1710 may be realized with various three-way valves.

The heating device 422 is coupled with a water output terminal of the fluid diverter 1710, and arranged to operably heat the water to produce hot water having a higher temperature. The cooling device 424 is coupled with a water output terminal of the fluid diverter 1710, and arranged to operably cool the water to produce cold water having a lower temperature. In other words, the temperature-adjusted water outputted from the external temperature adjustment device 1720 may refer to hot water or cold water. In practice, the heating device 422 may be realized with various appropriate water heaters capable of generating high-temperature drinking water, and the cooling device 424 may be realized with various appropriate water coolers capable of generating low-temperature drinking water.

Similar to the previous embodiments of FIG. 4 through FIG. 16, the source selection device 430 of FIG. 17 through FIG. 21 is coupled with the control circuit 480, and has multiple water input terminals and a water output terminal, wherein the multiple water input terminals are utilized for respectively coupled with multiple different water sources, and the water output terminal is utilized for outputting water received by one of the multiple water input terminals. The source selection device 430 is arranged to selectively output water transmitted from one of the multiple water sources under control of the control circuit 480. That is, the source selection device 430 is arranged to selectively output either temperature-adjusted water or water without temperature adjustment toward the flow direction control device 440 in the temperature-adjusted water dispensing device.

The source selection device 430 of FIG. 17 through FIG. 21 has a first water input terminal, a second water input terminal, and a third water input terminal. The first water input terminal is coupled with a water input port 402 through various appropriate connectors and/or pipes, and arranged to operably receive water without temperature adjustment outputted from the water input port 402. The second water input terminal is coupled with the output of the heating device 422 of the external temperature adjustment device 1720 through various appropriate connectors and/or pipes, and arranged to operably receive the hot water outputted from the heating device 422. The third water input terminal is coupled with the output of the cooling device 424 of the external temperature adjustment device 1720 through various appropriate connectors and/or pipes, and arranged to operably receive the cold water outputted from the cooling device 424.

In operations, the source selection device 430 is only allowed to output water received from one of the multiple water sources at the same time under control of the control circuit 480. That is, when the water output terminal of the source selection device 430 outputs the water without temperature adjustment transmitted from the water input port 402, the water output terminal of the source selection device 430 does not (or is unable to) output the hot water transmitted from the heating device 422 and the cold water transmitted from the cooling device 424 at the same time. In addition, when the water output terminal of the source selection device 430 outputs the hot water transmitted from the heating device 422, the water output terminal of the source selection device 430 does not (or is unable to) output the water without temperature adjustment transmitted from the water input port 402 and the cold water transmitted from the cooling device 424 at the same time. Furthermore, when the water output terminal of the source selection device 430 outputs the cold water transmitted from the cooling device 424, the water output terminal of the source selection device 430 does not (or is unable to) output the water without temperature adjustment transmitted from the water input port 402 and the hot water transmitted from the heating device 422 at the same time.

In practice, depending on the quantity of the water input terminals, the source selection device 430 may be realized with various water valves. For example, in the embodiments where the source selection device 430 has three water input terminals, the source selection device 430 may be realized with various four-way valves. In the embodiments where the source selection device 430 has two water input terminals, the source selection device 430 may be realized with various three-way valves.

Figure 17:
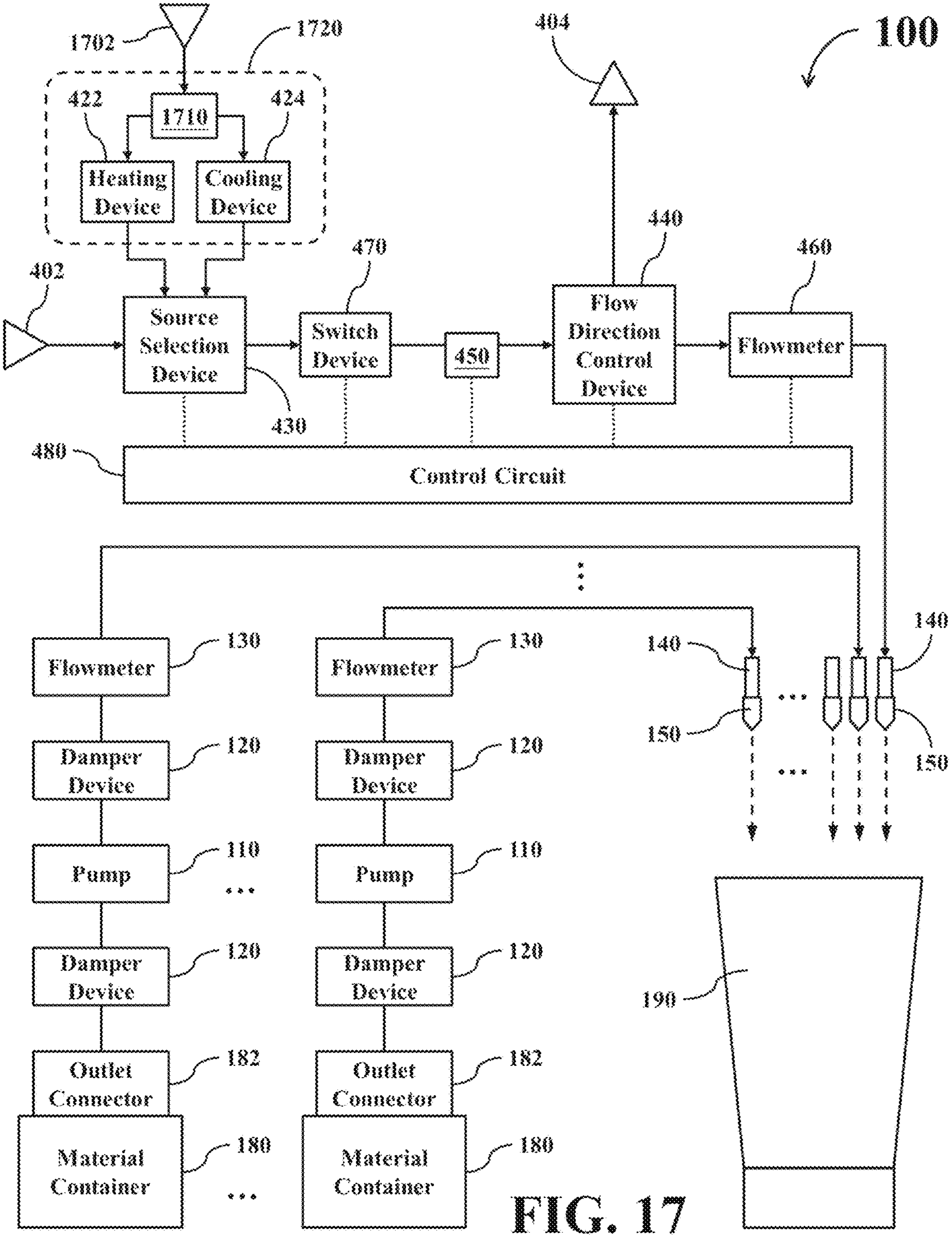
FIG. 17 shows a simplified functional block diagram of some components of the fluid material dispensing apparatus of FIG. 1 according to a fourteenth embodiment of the present disclosure.

In the embodiment of FIG. 17, the temperature-adjusted water dispensing device further comprises one or more temperature sensors (e.g., the temperature sensor 450). The foregoing descriptions regarding the connections, operations, functions, and variations of the temperature sensors 450, 1152, and 1154 of FIG. 4 through FIG. 12 are also applicable to the embodiment of FIG. 17.

Figure 18:
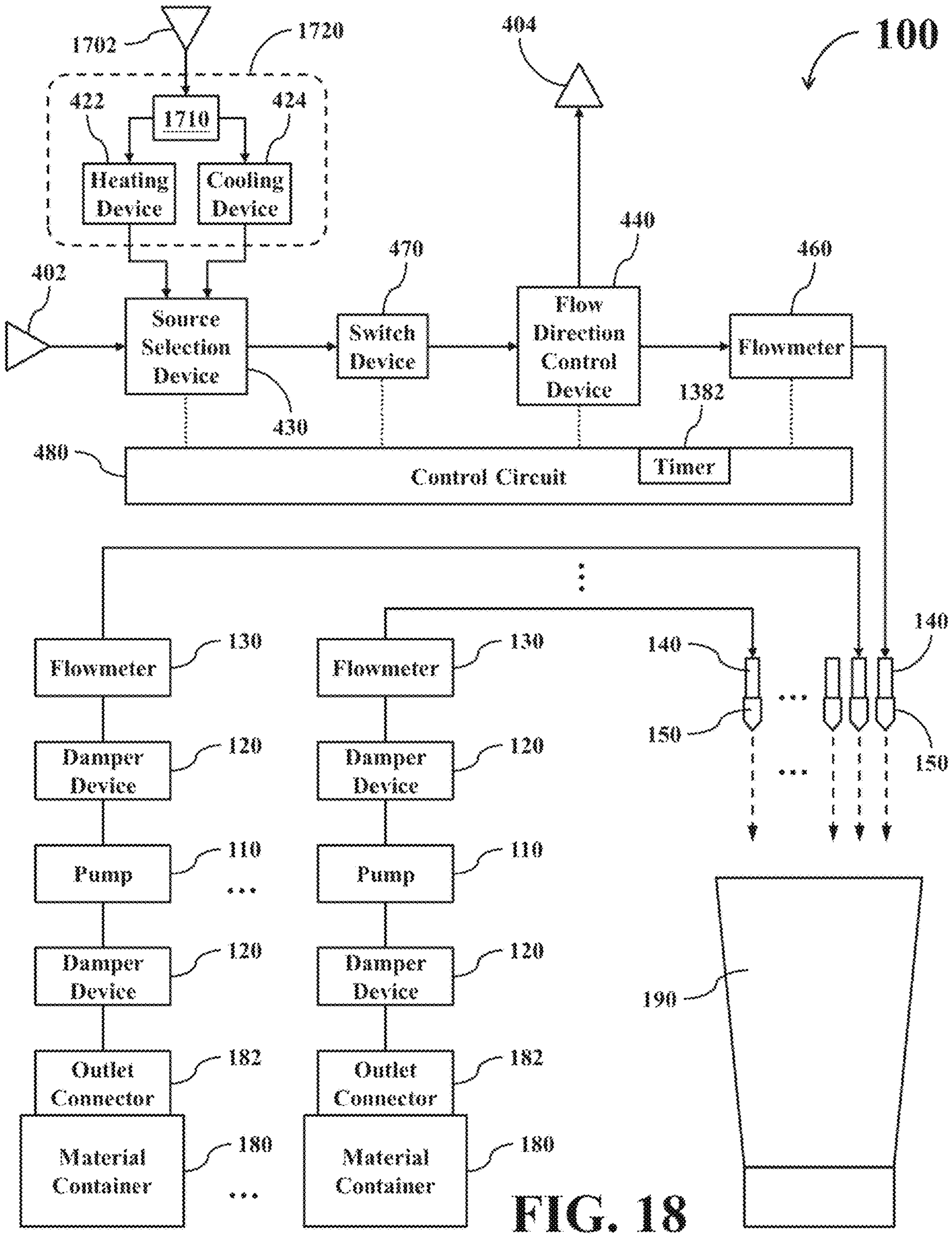
FIG. 18 shows a simplified functional block diagram of some components of the fluid material dispensing apparatus of FIG. 1 according to a fifteenth embodiment of the present disclosure.
Figure 19:
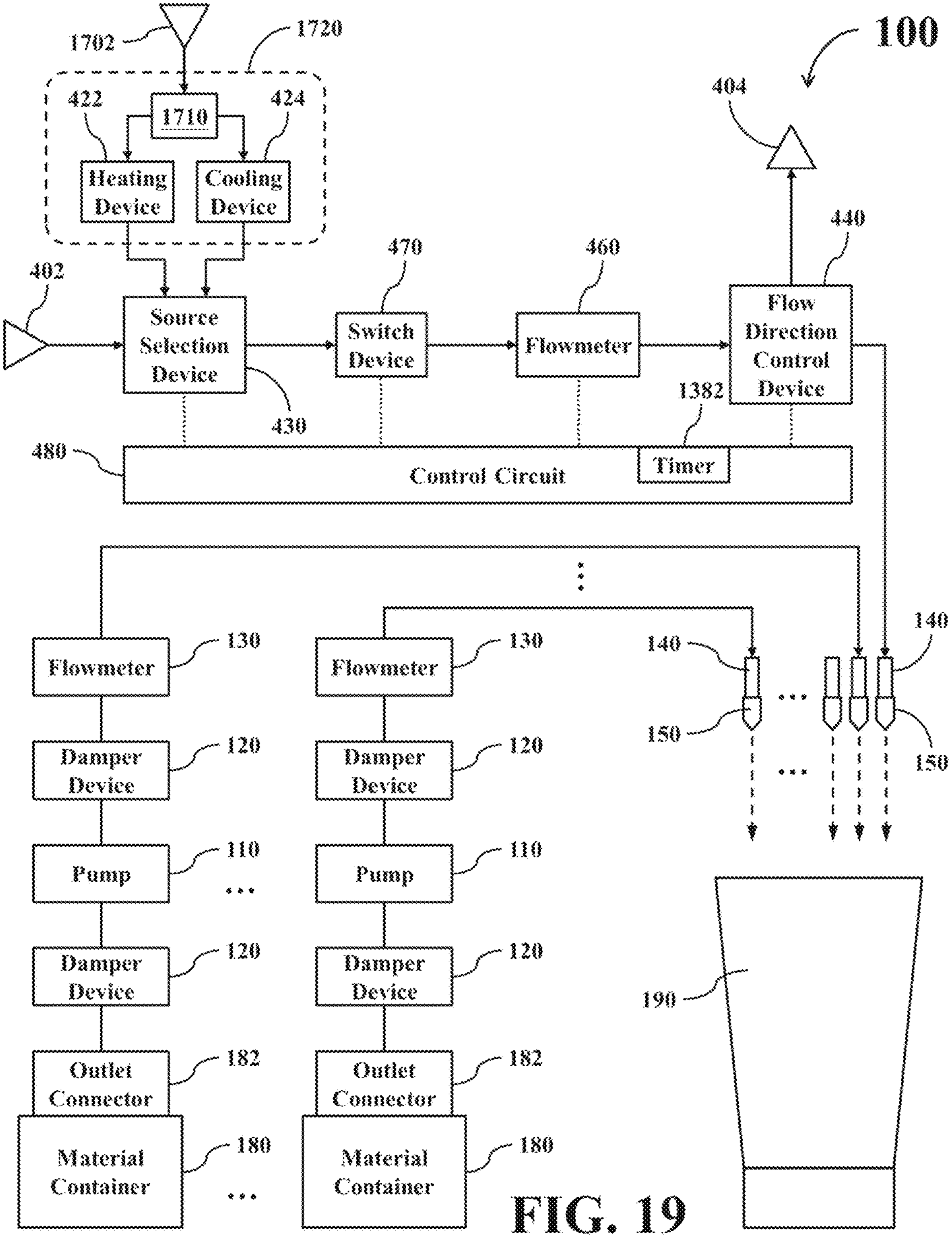
FIG. 19 shows a simplified functional block diagram of some components of the fluid material dispensing apparatus of FIG. 1 according to a sixteenth embodiment of the present disclosure.

In the embodiments of FIG. 18 and FIG. 19, the control circuit 480 of the temperature-adjusted water dispensing device further comprises a timer 1382. The foregoing descriptions regarding the connections, operations, functions, and variations of the timer 1382 of FIG. 13 through FIG. 14 are also applicable to the embodiments of FIG. 18 and FIG. 19.

Figure 20:
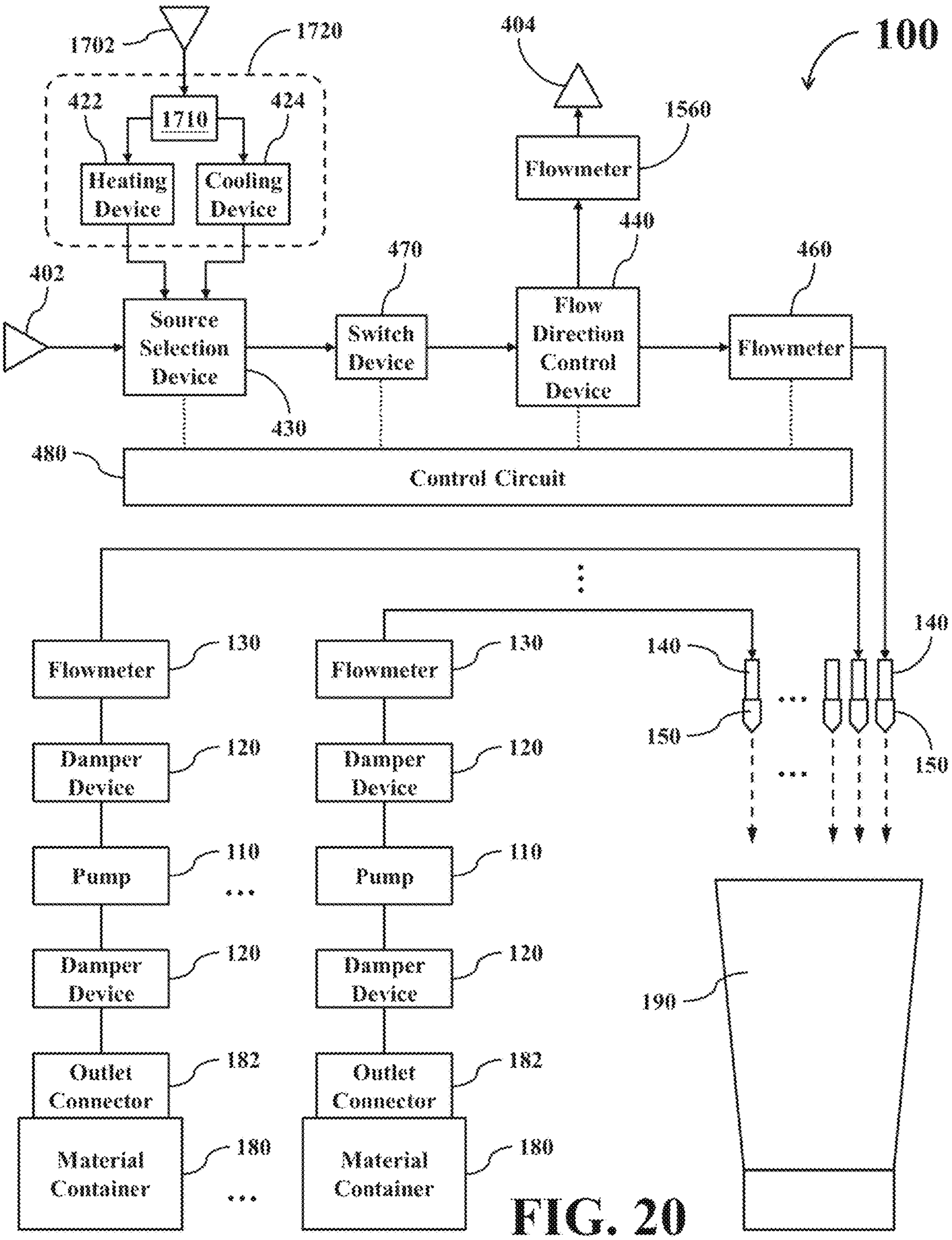
FIG. 20 shows a simplified functional block diagram of some components of the fluid material dispensing apparatus of FIG. 1 according to a seventeenth embodiment of the present disclosure.

In the embodiment of FIG. 20, the temperature-adjusted water dispensing device further comprises the flowmeter 1560. Similar to the embodiment of FIG. 15 described previously, the control circuit 480 of the temperature-adjusted water dispensing device of FIG. 20 estimates the temperature of the temperature-adjusted water according to the measurement value generated by the flowmeter 1560. The foregoing descriptions regarding the connections, operations, functions, and variations of the flowmeter 1560 and the control circuit 480 of FIG. 15 are also applicable to the embodiment of FIG. 20.

Figure 21:
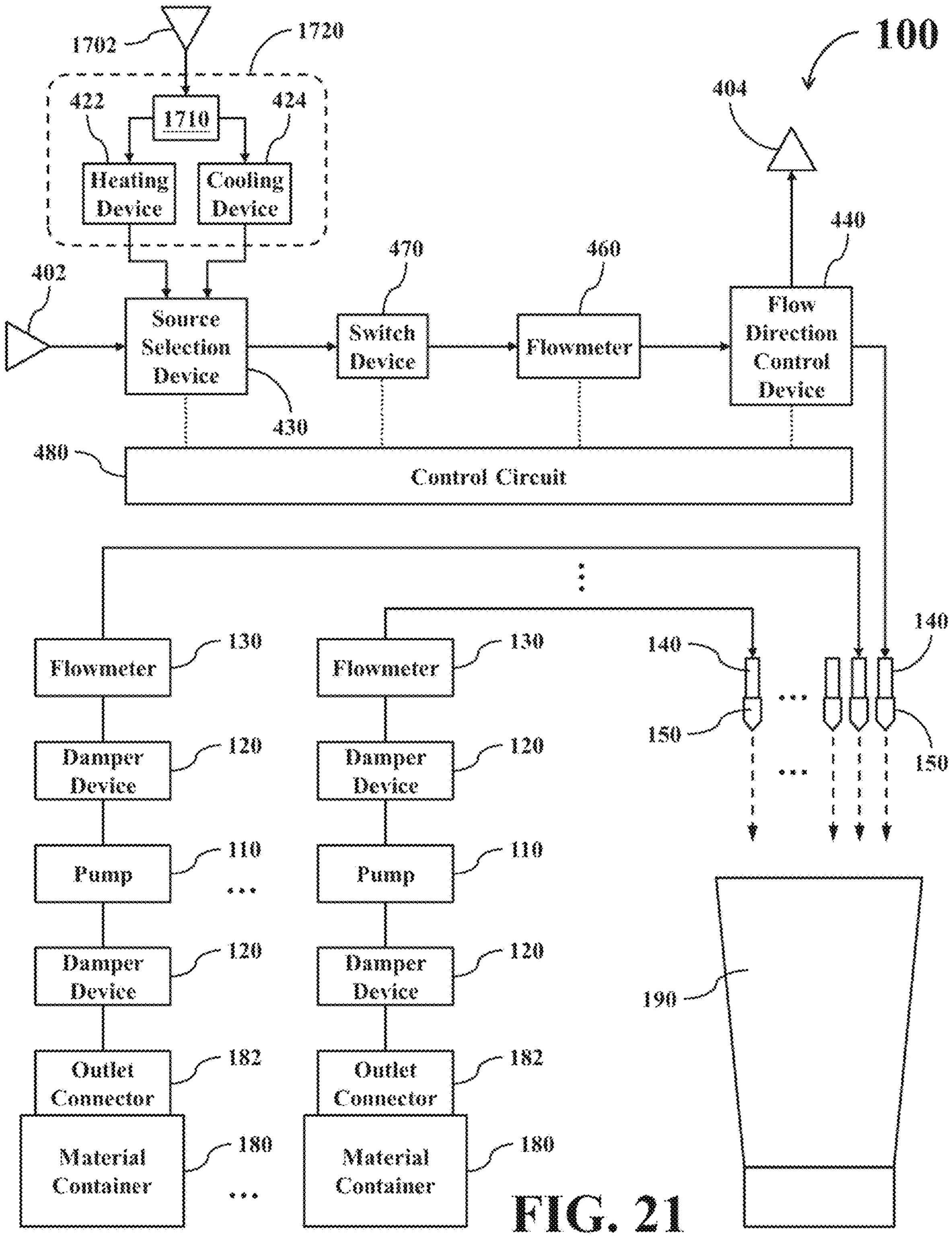
FIG. 21 shows a simplified functional block diagram of some components of the fluid material dispensing apparatus of FIG. 1 according to an eighteenth embodiment of the present disclosure.

Similar to the embodiment of FIG. 16 described previously, the control circuit 480 of the temperature-adjusted water dispensing device of FIG. 21 estimates the temperature of the temperature-adjusted water according to the measurement value generated by the flowmeter 460. The foregoing descriptions regarding the connections, operations, functions, and variations of the flowmeter 460 and the control circuit 480 of FIG. 16 are also applicable to the embodiment of FIG. 21.

The foregoing descriptions regarding the implementations, connections, operations, and related advantages of other corresponding functional blocks of the fluid material dispensing apparatus 100 of FIG. 4 through FIG. 16 are also applicable to the embodiments of FIG. 17 through FIG. 21. For the sake of brevity, those descriptions will not be repeated here.

As described previously, the fluid material dispensing apparatus 100 of FIG. 17 through FIG. 21 utilizes the external temperature adjustment device 1720 to replace the temperature adjustment device 420. In this way, the volume and power consumption of the fluid material dispensing apparatus 100 can be effectively reduced.

In addition, since the external temperature adjustment device 1720 that contains heating components (e.g., the heating device 422) or cooling components (e.g., the cooling device 424) is installed outside the fluid material dispensing apparatus 100, the insulation requirements for the internal space or internal components of the fluid material dispensing apparatus 100 can be significantly reduced.

Additionally, the disclosed structure of FIG. 17 through FIG. 21 can greatly increase the flexibility of the fluid material dispensing apparatus 100 in selecting the external temperature adjustment devices.

In some embodiments where the fluid material dispensing apparatus 100 is utilized as an automated beverage preparation apparatus, a user may place a target container 190 on an appropriate position beneath the aforementioned multiple nozzles 150 and manipulate the control panel 109 to configure one or more production parameters for the required freshly made beverages, such as beverage item, cup size, beverage volume, sugar level, ice level, and/or quantity of cups, or the like.

Then, the temperature-adjusted water dispensing device of the fluid material dispensing apparatus 100 would operate based on the parameters configured by the user to selectively dispense the water without temperature or the temperature-adjusted water to the target container 190 through a corresponding nozzle 150.

In addition, the material dispensing devices of the fluid material dispensing apparatus 100 would operate based on the parameters configured by the user to automatically utilizes one or more pumps 110 to extract the fluid materials from one or more material containers 180, and to transmit the extracted fluid materials toward corresponding nozzles 150 through respective transmission pipes. With the continuous operation of respective pump, related fluid materials will be dispensed to the target container 190 through corresponding nozzles 150.

Freshly made beverage of a variety of flavors can be obtained by mixing different fluid materials together in the target container 190 according to a particular ratio, or by simple stirring after mixing the fluid materials. In practice, the target container 190 may be designed to support or have a blending functionality to increase the speed and uniformity of mixing the fluid materials.

In the embodiment where the fluid material dispensing apparatus 100 is utilized as a sauce dispensing apparatus, the user may place the target container 190 on an appropriate position beneath the aforementioned multiple nozzles 150 and manipulate the control panel 109 to configure species and output amount of related sauce to be dispensed.

Similarly, the temperature-adjusted water dispensing device of the fluid material dispensing apparatus 100 would operate based on the parameters configured by the user to selectively dispense the water without temperature or the temperature-adjusted water to the target container 190 through a corresponding nozzle 150.

In addition, the material dispensing devices of the fluid material dispensing apparatus 100 would operate based on the parameters configured by the user to automatically utilizes one or more pumps 110 to extract the fluid materials from one or more material containers 180, and to transmit the extracted fluid materials toward corresponding nozzles 150 through respective transmission pipes. With the continuous operation of respective pump, the fluid material dispensing apparatus 100 is enabled to output a specific amount of one or more sauces to the target container 190 through corresponding nozzle 150.

Accordingly, the disclosed fluid material dispensing apparatus 100 is capable of accurately controlling the material output volume of respective fluid materials, and thus it is enabled to maintain the taste consistency of resulting freshly made beverages.

In addition, the disclosed fluid material dispensing apparatus 100 is also capable of accurately controlling the temperature and output volume of water to be dispensed, and thus it is enabled to flexibly adjust the temperature of resulting freshly made beverages.

Furthermore, the disclosed fluid material dispensing apparatus 100 is enabled to operate based on the parameters configured by the user to automatically utilize multiple material dispensing devices to output extracted fluid materials to the target container 190 through corresponding nozzles 150, and to automatically utilize the temperature-adjusted water dispensing device to output water with desired temperature and volume to the target container 190 through the corresponding nozzle 150, so as to achieve the automatic preparation of freshly made beverages. Therefore, the disclosed fluid material dispensing apparatus 100 not only effectively reduces the time and cost required for personnel training, but also significantly reduces the labor time required for involving in the preparation of the freshly made beverages.

Please note that the component structure and connections between components of the fluid material dispensing apparatus 100 in the aforementioned FIG. 4 through FIG. 21 are merely exemplary embodiments, rather than a restriction to the practical implementations of the fluid material dispensing apparatus 100.

For example, in some embodiments, the flowmeter 130 may be omitted, and the material dispensing device may utilize other approaches to measure the amount of fluid material to be dispensed to the target container 190. In one embodiment, the material dispensing device may utilize a timer to operably record a duration of time for operation of a particular component (e.g., the pump 110 or the damper device 120), and to operably generate a corresponding time-length value. The control circuit of the material dispensing device may estimate the output amount of the fluid material according to the time-length value generated by the timer. In another embodiment, the material dispensing device may utilize a weight scale to measure changes in the weight of the target container 190, and the control circuit of the material dispensing device may calculate the output amount of the fluid material based on the measurement results of the weight scale.

For another example, in some embodiments, a three-way valve is coupled among the heating device 422, the cooling device 424, and the source selection device 430. Specifically, the output of the heating device 422 is coupled with an input of the three-way valve, the output of the cooling device 424 is coupled with another input of the three-way valve, and a water input terminal of the source selection device 430 is coupled with the output of the three-way valve. In this situation, the source selection device 430 may be realized with various three-way valves, and the temperature sensor 1152 or the temperature sensor 1154 may be omitted.

For another example, in some embodiments, the heating device 422 or the cooling device 424 may be omitted.

For another example, the switch device 470 of FIG. 1 through FIG. 21 may be omitted.

For another example, the switch device 470 of FIG. 1 through FIG. 21 may be realized with a pump 470. In this situation, the control circuit 480 may control the pump 470 to operably push water (e.g., the temperature-adjusted water or the water without temperature adjustment described previously) outputted from the source selection device 430 to flow toward the flow direction control device 440. In practice, the pump 470 may be realized with various appropriate liquid pump devices capable of pushing liquid forward, such as a peristaltic pump, a diaphragm pump, a rotary diaphragm pump, or the like.

For another example, the flowmeter 460 of FIG. 1 through FIG. 21 may be omitted. In this situation, the fluid material dispensing apparatus 100 may utilize a weight scale to measure changes in the weight of the target container 190, and the control circuit 480 may calculate the output volume of the water without temperature or the temperature-adjusted water based on the measurement results of the weight scale. As a result, the control circuit 480 is enabled to control the output volume of the water without temperature or the temperature-adjusted water without using the flowmeter 460.

Certain terms are used throughout the description and the claims to refer to particular components. One skilled in the art appreciates that a component may be referred to by different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. For example, if this disclosure mentioned that a first circuit is coupled with a second circuit, it means that the first circuit may be directly or indirectly connected to the second circuit through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Throughout the description and claims, the term "element" contains the concept of component, layer, or region.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

For the purpose of explanatory convenience in the specification, spatially relative terms, such as "on," "above," "below," "beneath," "higher," "lower," "upward," "downward," "forward," "backward," and the like, may be used herein to describe the function of a particular element or to describe the relationship of one element to other element(s) as illustrated in the drawings. It will be understood that the spatially relative terms are intended to encompass different orientations of the element in use, in operations, or in assembly in addition to the orientation depicted in the drawings. For example, if the element in the drawings is turned over, elements described as "on" or "above" other elements would then be oriented "under" or "beneath" the other elements. Thus, the exemplary term "beneath" can encompass both an orientation of above and beneath. For another example, if the element in the drawings is reversed, the action described as "forward" may become "backward," and the action described as "backward" may become "forward." Thus, the exemplary description "forward" can encompass both an orientation of forward and backward.

Throughout the description and claims, it will be understood that when an element is referred to as being "positioned on," "positioned above," "connected to," "engaged with," or "coupled with" another element, it can be directly on, directly connected to, or directly engaged with the other element, or intervening element may be present. In contrast, when an element is referred to as being "directly on," "directly connected to," or "directly engaged with" another element, there are no intervening elements present.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A fluid material dispensing apparatus (100), comprising:

- a target nozzle (150), arranged to operably dispense water to a target container (190);
- a water drainage port (404);
- a temperature adjustment device (420), arranged to operably adjust a temperature of a received water to produce and output a temperature-adjusted water;
- a flow direction control device (440), comprising:
  - an input terminal, coupled with the temperature adjustment device (420), and arranged to operably receive the temperature-adjusted water produced by the temperature adjustment device (420);
  - a first output terminal, coupled with the target nozzle (150); and
  - a second output terminal, coupled with the water drainage port (404); and
- a control circuit (480), coupled with the flow direction control device (440), and arranged to operably control the flow direction control device (440); and
- one or more temperature sensors (450; 1152; 1154), coupled with the control circuit (480), and arranged to operably sense and report a temperature of the temperature-adjusted water to the control circuit (480);
- wherein when the control circuit (480) determines that the temperature of the temperature-adjusted water reaches a predetermined temperature according to sensing results of the one or more temperature sensors (450; 1152; 1154), the control circuit (480) controls the flow direction control device (440) to guide the temperature-adjusted water to flow toward the target nozzle (150) through the first output terminal, so that the target nozzle (150) dispenses the temperature-adjusted water into the target container (190).

2. The fluid material dispensing apparatus (100) of claim 1, wherein before the control circuit (480) determines that the temperature of the temperature-adjusted water reaches the predetermined temperature, the control circuit (480) controls the flow direction control device (440) to block the first output terminal and to guide the temperature-adjusted water to flow toward the water drainage port (404) through the second output terminal, so as to prevent the target nozzle (150) from dispensing the temperature-adjusted water into the target container (190).

3. The fluid material dispensing apparatus (100) of claim 2, further comprising:

- a flowmeter (460), coupled with the control circuit (480), and arranged to operably measure a flow of the temperature-adjusted water to be dispensed to the target container (190) through the target nozzle (150).

4. The fluid material dispensing apparatus (100) of claim 2, further comprising:

- a switch device (470), coupled between the temperature adjustment device (420) and the input terminal of the flow direction control device (440), and arranged to operably control whether the temperature-adjusted water can be transmitted to the flow direction control device (440).

5. The fluid material dispensing apparatus (100) of claim 2, further comprising:

- a pump (470), coupled between the temperature adjustment device (420) and the input terminal of the flow direction control device (440), and arranged to operably push the temperature-adjusted water to flow toward the flow direction control device (440).

6. The fluid material dispensing apparatus (100) of claim 2, further comprising:

- a source selection device (430), coupled between the temperature adjustment device (420) and the input terminal of the flow direction control device (440), and arranged to operably receive the temperature-adjusted water outputted from the temperature adjustment device (420) and water without temperature adjustment;
- wherein the control circuit (480) is further arranged to operably control the source selection device (430) to selectively output either the temperature-adjusted water or the water without temperature adjustment.

7. The fluid material dispensing apparatus (100) of claim 1, wherein the one or more temperature sensors (450; 1152; 1154) comprise:

- a temperature sensor (450; 1152; 1154), arranged to operably sense the temperature of the temperature-adjusted water to be transmitted from the temperature adjustment device (420) to the input terminal of the flow direction control device (440).

8. The fluid material dispensing apparatus (100) of claim 1, wherein the one or more temperature sensors (450; 1152; 1154) comprise:

- a temperature sensor (450), arranged to operably sense the temperature of the temperature-adjusted water transmitted from the second output terminal of the flow direction control device (440) to the water drainage port (404).

* * * * *